(12) United States Patent
Vollath et al.

(10) Patent No.: US 9,562,975 B2
(45) Date of Patent: Feb. 7, 2017

(54) GNSS SIGNAL PROCESSING WITH DELTA PHASE FOR INCORRECT STARTING POSITION

(75) Inventors: Ulrich Vollath, Superior, CO (US); Nicholas Charles Talbot, Ashburton (AU); Markus Glocker, Munich (DE); Xiaoming Chen, Hoehenkirchen (DE); Rodrigo Leandro, Ottobrunn (DE)

(73) Assignee: Trimble Inc., Sunnyvale, CA (US)

( * ) Notice: Subject to any disclaimer, the term of this patent is extended or adjusted under 35 U.S.C. 154(b) by 670 days.

(21) Appl. No.: 14/002,721

(22) PCT Filed: Mar. 19, 2012

(86) PCT No.: PCT/US2012/029694
§ 371 (c)(1),
(2), (4) Date: Sep. 1, 2013

(87) PCT Pub. No.: WO2012/151006
PCT Pub. Date: Nov. 8, 2012

(65) Prior Publication Data
US 2013/0335266 A1 Dec. 19, 2013

Related U.S. Application Data

(60) Provisional application No. 61/466,050, filed on Mar. 22, 2011.

(51) Int. Cl.
*G01S 19/42* (2010.01)
*G01S 19/43* (2010.01)
(Continued)

(52) U.S. Cl.
CPC .............. *G01S 19/42* (2013.01); *G01S 19/07* (2013.01); *G01S 19/25* (2013.01); *G01S 19/43* (2013.01)

(58) Field of Classification Search
CPC .......... G01S 19/42; G01S 19/07; G01S 19/25; G01S 19/43
(Continued)

(56) References Cited

U.S. PATENT DOCUMENTS 5,311,194 A 5/1994 Brown
5,323,322 A 6/1994 Mueller et al.
(Continued)

FOREIGN PATENT DOCUMENTS

CN 1875291 12/2006
CN 101449177 10/2012
(Continued)

OTHER PUBLICATIONS

Extended European Search Report of Jan. 21, 2015 for European Patent Application 12779870.0, 8 pages.
(Continued)

*Primary Examiner* — Frank J McGue
(74) *Attorney, Agent, or Firm* — Kilpatrick Townsend & Stockton LLP

(57) ABSTRACT

Methods and apparatus for processing of GNSS signals are presented. These include GNSS processing with predicted precise clocks, GNSS processing with mixed-quality data, GNSS processing with time-sequence maintenance, GNSS processing with reduction of position jumps in low-latency solutions, GNSS processing with position blending to bridge reference station changes, and GNSS processing with delta-phase correction for incorrect starting position.

5 Claims, 17 Drawing Sheets

(51) Int. Cl.
*G01S 19/07* (2010.01)
*G01S 19/25* (2010.01)

(58) Field of Classification Search
USPC .................................................. 342/357.02
See application file for complete search history.

(56) References Cited

U.S. PATENT DOCUMENTS

| | | | |
|---|---|---|---|
| 5,828,336 A | 10/1998 | Yunck et al. | |
| 5,841,026 A * | 11/1998 | Kirk | G01C 15/00 342/358 |
| 5,893,044 A | 4/1999 | King et al. | |
| 6,127,968 A * | 10/2000 | Lu | G01S 19/44 342/357.31 |
| 6,295,021 B1 | 9/2001 | Lichten et al. | |
| 6,324,473 B1 | 11/2001 | Eschenbach | |
| 6,415,223 B1 * | 7/2002 | Lin | G01C 21/20 340/988 |
| 6,424,914 B1 * | 7/2002 | Lin | G01C 21/165 342/357.29 |
| 6,662,107 B2 | 12/2003 | Gronemeyer | |
| 7,117,417 B2 | 10/2006 | Sharpe et al. | |
| 7,292,185 B2 | 11/2007 | Whitehead et al. | |
| 7,312,747 B2 | 12/2007 | Vollath et al. | |
| 7,432,853 B2 | 10/2008 | Vollath | |
| 7,498,979 B2 | 3/2009 | Liu et al. | |
| 7,538,721 B2 | 5/2009 | Vollath et al. | |
| 7,541,975 B2 | 6/2009 | Sever et al. | |
| 7,576,690 B2 | 8/2009 | Vollath | |
| 7,589,668 B2 | 9/2009 | Vollath et al. | |
| 7,692,578 B2 | 4/2010 | Vollath et al. | |
| 7,746,272 B2 | 6/2010 | Vollath | |
| 7,755,542 B2 | 7/2010 | Chen et al. | |
| 7,768,449 B2 | 8/2010 | Gaal et al. | |
| 7,868,820 B2 | 1/2011 | Kolb | |
| 7,961,143 B2 | 6/2011 | Dai et al. | |
| 7,982,667 B2 | 7/2011 | Vollath et al. | |
| 8,018,377 B2 | 9/2011 | Collins | |
| 8,035,552 B2 | 10/2011 | Dai et al. | |
| 8,130,143 B2 | 3/2012 | Liu et al. | |
| 8,237,609 B2 | 8/2012 | Talbot et al. | |
| 8,242,953 B2 | 8/2012 | Dai et al. | |
| 8,260,551 B2 | 9/2012 | Janky et al. | |
| 8,334,807 B2 | 12/2012 | Gaal et al. | |
| 8,368,590 B2 | 2/2013 | Vollath et al. | |
| 8,368,591 B2 | 2/2013 | Talbot et al. | |
| 8,400,351 B2 | 3/2013 | Talbot et al. | |
| 8,542,146 B2 | 9/2013 | Vollath | |
| 8,558,736 B2 | 10/2013 | Talbot et al. | |
| 8,587,475 B2 | 11/2013 | Leandro | |
| 8,614,642 B2 | 12/2013 | Talbot et al. | |
| 8,694,250 B2 | 4/2014 | Talbot et al. | |
| 8,704,708 B2 | 4/2014 | Vollath | |
| 8,704,709 B2 | 4/2014 | Vollath et al. | |
| 2003/0016147 A1 | 1/2003 | Evans | |
| 2003/0048218 A1 | 3/2003 | Milnes et al. | |
| 2005/0055160 A1 | 3/2005 | King | |
| 2005/0064878 A1 | 3/2005 | O'Meagher | |
| 2005/0101248 A1 | 5/2005 | Vollath | |
| 2005/0248485 A1 * | 11/2005 | Hatch | G01S 19/43 342/357.26 |
| 2007/0063894 A1 | 3/2007 | Yu | |
| 2007/0171124 A1 | 7/2007 | Weill | |
| 2007/0200753 A1 | 8/2007 | Fuchs et al. | |
| 2008/0036654 A1 | 2/2008 | Hansen et al. | |
| 2008/0192242 A1 | 8/2008 | Nichols | |
| 2008/0204312 A1 | 8/2008 | Euler | |
| 2008/0238768 A1 | 10/2008 | Nasworthy | |
| 2008/0258966 A1 | 10/2008 | Sugimoto et al. | |
| 2009/0027264 A1 | 1/2009 | Chen et al. | |
| 2009/0058723 A1 * | 3/2009 | Mao | G01S 19/47 342/357.3 |
| 2009/0098880 A1 | 4/2009 | Lindquist | |
| 2009/0109090 A1 | 4/2009 | Vollath | |
| 2009/0135057 A1 | 5/2009 | Vollath et al. | |
| 2009/0140914 A1 | 6/2009 | Talbot et al. | |
| 2009/0179792 A1 | 7/2009 | Remondi | |
| 2009/0179793 A1 | 7/2009 | Remondi | |
| 2009/0184869 A1 | 7/2009 | Talbot et al. | |
| 2009/0224969 A1 | 9/2009 | Kolb | |
| 2009/0237298 A1 | 9/2009 | Vollath et al. | |
| 2009/0322600 A1 | 12/2009 | Whitehead et al. | |
| 2010/0033370 A1 | 2/2010 | Lopez et al. | |
| 2010/0090896 A1 * | 4/2010 | LaMance | G01S 19/05 342/357.66 |
| 2010/0141515 A1 | 6/2010 | Doucet et al. | |
| 2010/0156709 A1 | 6/2010 | Zhang et al. | |
| 2010/0177806 A1 | 7/2010 | Normark et al. | |
| 2010/0214161 A1 | 8/2010 | Talbot et al. | |
| 2010/0214162 A1 | 8/2010 | Talbot et al. | |
| 2010/0245168 A1 | 9/2010 | Rollet et al. | |
| 2010/0253575 A1 | 10/2010 | Vollath | |
| 2011/0140959 A1 | 6/2011 | Vollath | |
| 2011/0148698 A1 | 6/2011 | Vollath | |
| 2011/0156949 A1 | 6/2011 | Vollath et al. | |
| 2011/0187590 A1 | 8/2011 | Leandro | |
| 2011/0267228 A1 | 11/2011 | Talbot et al. | |
| 2011/0279314 A1 | 11/2011 | Talbot et al. | |
| 2011/0285587 A1 | 11/2011 | Vollath et al. | |
| 2012/0026038 A1 | 2/2012 | Vollath | |
| 2012/0092213 A1 | 4/2012 | Chen | |
| 2012/0119944 A1 | 5/2012 | Chen | |
| 2012/0154210 A1 | 6/2012 | Landau et al. | |
| 2012/0154214 A1 | 6/2012 | Leandro | |
| 2012/0154215 A1 | 6/2012 | Vollath et al. | |
| 2012/0162007 A1 | 6/2012 | Leandro et al. | |
| 2012/0163419 A1 | 6/2012 | Seeger | |
| 2012/0229332 A1 | 9/2012 | Vollath et al. | |
| 2012/0286991 A1 | 11/2012 | Chen et al. | |
| 2012/0293367 A1 | 11/2012 | Chen et al. | |
| 2012/0306694 A1 | 12/2012 | Chen et al. | |
| 2013/0044026 A1 | 2/2013 | Chen et al. | |
| 2013/0335266 A1 | 12/2013 | Vollath et al. | |
| 2014/0002300 A1 | 1/2014 | Leandro et al. | |
| 2014/0015712 A1 | 1/2014 | Leandro et al. | |

FOREIGN PATENT DOCUMENTS

| | | |
|---|---|---|
| CN | 101743453 | 3/2013 |
| CN | 101365957 | 6/2013 |
| EP | 1 862 809 A1 | 12/2007 |
| EP | 2 037 291 A1 | 3/2009 |
| WO | 03/038464 A2 | 5/2003 |
| WO | 2005/043186 A2 | 5/2005 |
| WO | 2007/082038 A1 | 7/2007 |
| WO | 2010/096159 A2 | 8/2010 |

OTHER PUBLICATIONS

International Search Report and Written Opinion of the International Searching Authority mailed May 31, 2011 in International Application No. PCT/US2010/002565 (six pages).
International Search Report and Written Opinion of the International Searching Authority mailed May 31, 2011 in International Application No. PCT/US2010/002564 (seven pages).
International Search Report and Written Opinion of the International Searching Authority mailed May 30, 2011 in International Application No. PCT/US2010/002563 (six pages).
International Search Report and Written Opinion of the International Searching Authority mailed May 26, 2011 in International Application No. PCT/US2010/002562 (six pages).
International Search Report and Written Opinion of the International Searching Authority mailed May 31, 2011 in International Application No. PCT/US2010/002581 (six pages).
International Search Report and Written Opinion of the International Searching Authority mailed Sep. 27, 2011 in International Application No. PCT/US2011/024733 (ten pages).
International Search Report and Written Opinion of the International Searching Authority mailed Oct. 6, 2011 in International Application No. PCT/US2011/024743 (ten pages).

(56) References Cited

OTHER PUBLICATIONS

International Search Report and Written Opinion of the International Searching Authority mailed Sep. 26, 2011 in International Application No. PCT/US2011/024763 (ten pages).
International Search Report and Written Opinion of the International Searching Authority mailed Oct. 12, 2012 in International Application No. PCT/US2012/029694 (fourteen pages).
International Search Report and Written Opinion of the International Searching Authority mailed Oct. 16, 2012 in International Application No. PCT/US2012/028670 (eight pages).
International Search Report and Written Opinion of the International Searching Authority mailed Sep. 5, 2012 in International Application No. PCT/US2012/028671 (eight pages).
S. Banville et al., "Satellite and Receiver Phase Bias Calibration for Undifferenced Ambiguity Resolution," Proceedings of the 2008 National Technical Meeting of The Institute of Navigation, San Diego, CA, Jan. 2008, pp. 711-719.
Y. Bar-Sever et al., "A new model for GPS yaw attitude," Journal of Geodesy, vol. 70, No. 11, Nov. 1996, pp. 714-723 (abstract only).
G. Bierman, Factorization Methods for Discrete Sequential Estimation, Academic Press, Inc., 1977, 129 pp.
S. Bisnath et al., "Precise Orbit Determination of Low Earth Orbiters with GPS Point Positioning," Proceedings of the 2001 National Technical Meeting of The Institute of Navigation, Long Beach, CA, Jan. 2001, pp. 725-733.
P. Collins, "Isolating and Estimating Undifferenced GPS Integer Ambiguities," Proceedings of the 2008 National Technical Meeting of The Institute of Navigation, San Diego, CA, Jan. 2008, pp. 720-732.
P. Collins et al., "Precise Point Positioning with Ambiguity Resolution using the Decoupled Clock Model," Proceedings of the 21st International Technical Meeting of the Satellite Division of The Institute of Navigation (ION GNSS 2008), Savannah, GA, Sep. 2008, pp. 1315-1322.
P. Collins et al., "Accessing and Processing Real-Time GPS Corrections for Precise Point Positioning . . . Some User Considerations," Proceedings of the 18th International Technical Meeting of the Satellite Division of The Institute of Navigation (ION GNSS 2005), Long Beach, CA, Sep. 2005, pp. 1483-1491.
Y. Gao et al., "A New Method for Carrier-Phase-Based Precise Point Positioning", Navigation, Journal of The Institute of Navigation, vol. 49, No. 2, Summer 2002, pp. 109-116.
"GNSS Solutions: Precise Point Positioning and Its Challenges, Aided-GNSS and Signal Tracking," Inside GNSS, Nov./Dec. 2006, pp. 16-21.
M. Gabor et al., "Satellite-Satellite Single-Difference Phase Bias Calibration as Applied to Ambiguity Resolution", Navigation, Journal of The Institute of Navigation, vol. 49, No. 4, Winter 2002-2003, pp. 223-247.
M. Ge et al., "Resolution of GPS carrier-phase ambiguities in Precise Point Positioning (PPP) with daily observations," Journal of Geodesy, Jul. 2008, vol. 82, Issue 7, pp. 389-399.
A. Hauschild et al., "Real-time Clock Estimation for Precise Orbit Determination of LEO-Satellites," Proceedings of the 21st International Technical Meeting of the Satellite Division of The Institute of Navigation (ION GNSS 2008), Savannah, GA, Sep. 2008, pp. 581-589.
P. Heroux et al., "GPS Precise Point Positioning Using IGS Orbit Products," Phys. Chem. Earth (A), vol. 26, No. 6-8. pp. 573-578, 2001.
P. Heroux et al., "GPS Precise Point Positioning with a Difference," presented at Geomatics '95, Ottawa, Ontario, Canada, Jun. 13-15, 1995, 11 pp.
S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.
IERS Conventions (2003), International Earth Rotation and Reference Systems Service, IERS Technical Note No. 32, 127 pp.
"IGS Product Table—updated for 2009," from http://igsch.jpl.nasa.gov/components/prods.html on Aug. 19, 2009, three pages.
J. Kouba, "A simplified yaw-attitude model for eclipsing GPS satellites," GPS Solutions, Jan. 2009, vol. 13, Issue 1, pp. 1-12.
J. Kouba, "A guide to using International GPS Service (IGS) Products," International GPS Service, Feb. 2003, 31 pp.
J. Kouba et al., "Precise Point Positioning Using IGS Orbit and Clock Products," GPS Solutions, Oct. 2001, vol. 5, Issue 2, pp. 12-28.
D. Lapucha et al., "Comparison of the Two Alternate Methods of Wide Area Carrier Phase Positioning," Proceedings of the 17th International Technical Meeting of the Satellite Division of The Institute of Navigation (ION GNSS 2004), Long Beach, CA, Sep. 2004, pp. 1864-1871.
D. Laurichesse et al., "Real Time Zero-difference Ambiguities Fixing and Absolute RTK," Proceedings of the 2008 National Technical Meeting of The Institute of Navigation, San Diego, CA, Jan. 2008, pp. 747-755.
D. Laurichesse et al., "Integer Ambiguity Resolution on Undifferenced GPS Phase Measurements and its Application to PPP," Proceedings of the 20th International Technical Meeting of the Satellite Division of The Institute of Navigation (ION GNSS 2007), Fort Worth, TX, Sep. 2007, pp. 839-848.
R. Leandro et al., "Wide Area Based Precise Point Positioning," Proceedings of the 19th International Technical Meeting of the Satellite Division of The Institute of Navigation (ION GNSS 2006), Fort Worth, TX, Sep. 2006, pp. 2272-2278.
R. Leandro et al., "UNB Neutral Atmosphere Models: Development and Performance," Proceedings of the 2006 National Technical Meeting of The Institute of Navigation, Monterey, CA, Jan. 2006, pp. 564-573.
S. Lo et al., "GNSS Album: Images and Spectral Signature of the New GNSS Signals," Inside GNSS, May/Jun. 2006, pp. 46-56.
W. Melbourne, "The case for ranging in GPS based geodetic systems," Proceedings 1st International Symposium on Precise Positioning with the Global Positioning system, U.S. Department of Commerce, Rockville, Maryland, Apr. 15-19, vol. 1, pp. 373-386.
L. Mervart et al., "Precise Point Positioning with Ambiguity Resolution in Real-Time," Proceedings of the 21st International Technical Meeting of the Satellite Division of The Institute of Navigation (ION GNSS 2008), Savannah, GA, Sep. 2008, pp. 397-405.
Y. Mireault et al., "Online Precise Point Positioning," GPS World, Sep. 2008, pp. 59-64.
A. Niell, "Global mapping functions for the atmosphere delay at radio wavelengths," Journal of Geophysical Research, vol. 101, No. B2, pp. 3227-3246, Feb. 10, 1996.
S. Schaer, [IGSMAIL-287]: Monitoring (P1-C1) code biases, IGS Electronic Mail Message No. 2827, May 9, 2000, two pages.
G. Seeber, Satellite Geodesy, 2d. Ed., 2003, p. 31.
P. Tetrault et al., "CSRS-PPP: An Internet Service for GPS User Access to the Canadian Spatial Reference Frame," Geomatica, vol. 59, No. 1, 2005, pp. 17-28.
A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.
S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.
G. Wubbena, "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).
J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.

\* cited by examiner

GNSS SIGNAL PROCESSING WITH DELTA PHASE FOR INCORRECT STARTING POSITION

CROSS REFERENCE TO RELATED APPLICATIONS

The following are related hereto and incorporated herein in their entirety by this reference: U.S. Provisional Application for Patent No. 61/277,184 filed 19 Sep. 2009 (TNL A-2585P); International Patent Application PCT/US2010/02565 filed 19 Sep. 2010 (TNL A-2565PCT); International Patent Application PCT/US2010/02564 filed 19 Sep. 2010, WO 2011/034616 A2 dated 24 Mar. 2011 (TNL A-2585PCT); International Patent Application PCT/US2010/02563 filed 19 Sep. 2010 (TNL A-2599PCT); International Patent Application PCT/US2010/02562 filed 19 Sep. 2010 (TNL A-2617PCT); International Patent Application PCT/US2010/02581 filed 19 Sep. 2010 (TNL A-2647PCT); U.S. Provisional Application for Patent No. 61/337,980 filed 14 Feb. 2010 (TNL A-2633P); International Patent Application PCT/US2011/24733 filed 14 Feb. 2011, WO 2011/126605 A2 dated 13 Oct. 2011 (TNL A-2633PCT); International Patent Application PCT/US2011/24743 filed 14 Feb. 2011 (TNL A-2939PCT); International Patent Application PCT/US2011/24763 filed 14 Feb. 2011 (TNL A-2940PCT); U.S. Provisional Application for Patent No. 61/442,680 filed 14 Feb. 2011 (TNL A-2801P); International Patent Application PCT/US2009/059552 filed 5 Oct. 2009 (TNL A-2288PCT); U.S. Provisional Application for Patent No. 61/195,276 filed 6 Oct. 2008 (TNL A-2288P); International Patent Application PCT/US/2009/004471 filed 5 Aug. 2009 (TNL A-2526PCT); International Patent Application PCT/US/2009/004473 filed 5 Aug. 2009 (TNL A-2525PCT); International Patent Application PCT/US/2009/004474 filed 5 Aug. 2009 (TNL A-2524PCT); International Patent Application PCT/US/2009/004472 filed 5 Aug. 2009 (TNL A-2523PCT); International Patent Application PCT/US/2009/004476 filed 5 Aug. 2009 (TNL A-2339PCT); U.S. Provisional Application for Patent No. 61/189,382 filed 19 Aug. 2008 (TNL A-2339P); U.S. patent application Ser. No. 12/224,451 filed 26 Aug. 2008, U.S. Patent Application Publication US 2009/0027625 A1 (TNL A-1789US); International Patent Application PCT/US07/05874 filed 7 Mar. 2007, International Publication No. WO 2008/008099 A2 (TNL A-1789PCT); U.S. patent application Ser. No. 11/988,763 filed 14 Jan. 2008, United States Patent Application Publication US 2009/0224969 A1 (TNL A-1743US); International Patent Application No. PCT/US/2006/034433 filed 5 Sep. 2006, International Publication No. WO 2007/032947 A1 (TNL A-1743PCT); U.S. Pat. No. 7,432,853 granted 7 Oct. 2008; (TNL A-1403US); (TNL A-1403PCT); International Patent Application No. PCT/US2004/035263 filed 22 Oct. 2004 and International Publication Number WO 2005/045463 A1 (TNL A-1403PCT); U.S. Pat. No. 6,862,526 granted 1 Mar. 2005 (TNL A-1006US); and U.S. Provisional Application for Patent No. 61/396,676, filed 30 May 2010 (TNL A-2751P).

This application claims benefit of U.S. Provisional Application for Patent No. 61/466,050, filed 22 Mar. 2011, the content of which is incorporated herein by this reference. A copy of International Patent Application PCT/US2011/24733 filed 14 Feb. 2011 (TNL A-2633PCT) is attached to and forms a part of this provisional application for United States Patent, including Appendix A thereof which is a copy of U.S. Provisional Application for Patent No. 61/277,184 filed 19 Sep. 2009 (TNL A-2585P).

TECHNICAL FIELD

The present invention relates to the field of Global Navigation Satellite Systems (GNSS). More particularly, the present invention relates to methods and apparatus for processing GNSS data for enhanced Real-Time Kinematic (RTK) positioning.

BACKGROUND

Global Navigation Satellite Systems (GNSS) include the Global Positioning System, the GLONASS system, the proposed Galileo system and the proposed Compass system.

In traditional RTK (Real-Time Kinematic) GNSS positioning, the rover receiver (rover) collects real-time GNSS signal data and receives correction data from a base station, or a network of reference stations. The base station and reference stations receive GNSS signals at the same instant as the rover. Because the correction data arrives at the rover with a finite delay (latency) due to processing and communication, the rover needs to store (buffer) its locally-collected data and time-matches it with the received correction data to form single-difference observations using common satellites. The rover then uses the single-difference GNSS observations to compute a synchronous position for each epoch using the time-matched data. The single-difference process greatly reduces the impact of satellite clock errors. When the reference receiver and rover receiver are closely spaced, satellite orbit errors and atmospheric errors are also reduced by the single-differencing process. Synchronous position solutions yield maximum accuracy.

The need to wait for the correction data means that the synchronous position solution is latent. The solution latency includes:
Reference receiver measurement acquisition time,
Data formatting,
Data link communications,
Correction data decoding and synchronization,
Network processing (for network solutions),
Rover receiver measurement acquisition time,
Rover solution computation.

A prior-art delta phase method used in kinematic survey is aimed at producing low-latency estimates of the rover position without waiting for the matching (synchronous) correction data to be received (see Talbot et. al., *Centimeter Accurate Global Positioning System Receiver for On-The-Fly Real-Time Kinematic Measurement and Control*, U.S. Pat. No. 5,602,741, 11 Feb. 1997). When synchronous correction data are available for a given epoch, the rover uses them to compute a synchronous position for that epoch. When synchronous correction data are not available for a current epoch, the rover estimates its delta position (the rover position difference) from the last synchronous epoch until the current epoch and adds this delta position to the last synchronous position to obtain a current low-latency position estimate while awaiting correction data for a further synchronous epoch. The cost of this low-latency scheme is an additional error of about 2-4 mm per second of time difference between rover and correction data. The additional error is due mainly to instability of the GNSS satellite clocks.

FIG. 1 schematically illustrates a scenario using a GNSS rover with correction data for point surveying. A user 100 has a rover receiver (rover) 105 which is mounted on a range pole 110 or in some cases is a hand-held, or machine-mounted unit without a range pole. Rover 105 includes a GNSS antenna 115 and a communications antenna 120. Rover 105 receives at its GNSS antenna 115 the signals from GNSS satellites 125, 130, 135, 140, 145, etc. Rover 105 also receives at its communications antenna 120 correction data from a corrections source 150 via a communications link 155. The communications link is, for example, a radio link or mobile telephone link, or any other suitable means of conveying the correction data to the rover 105. The correction data can be of any suitable type for improving the positioning accuracy of rover 105, such as: differential base station data from a base station serving as corrections source 150, or virtual reference station data from a network of reference stations serving as corrections source 150 (WAAS is one example), or precise orbits and clocks data from a Precise Point Positioning (PPP) service such as that described in U.S. Provisional Application for Patent No. 61/277,184 filed 19 Sep. 2009 (TNL A-2585P) and in International Publication Number WO 2011/034616 A2 dated 24 Mar. 2011 (TNL A-2585PCT). In the example of FIG. 1, the phase center of GNSS antenna 115 is determined and reduced for the height and orientation of the range pole 110 to the survey point 160.

FIG. 2 is a block diagram of a typical integrated receiver system 200 with GNSS antenna 115 and communications antenna 120. Receiver system 200 can serve as rover 105 or as a base station or reference station. Receiver system 200 includes a GNSS receiver 205, a computer system 210 and one or more communications links 215. Computer system 210 includes one or more processors 220, one or more data storage elements 225, program code 230 for controlling the processor(s) 220, and user input/output devices 235 which may include one or more output devices 240 such as a display or speaker or printer and one or more devices 245 for receiving user input such as a keyboard or touch pad or mouse or microphone.

The program code 230 is adapted to perform novel functions in accordance with embodiments of the invention as described below. The integrated receiver system 200 can otherwise be of a conventional type suited for mounting on a range pole or for hand-held operation; some examples include the Trimble R8 GNSS, Trimble R7 GNSS, Trimble R6 GPS and Trimble 5700 surveying systems and the Trimble GPS Pathfinder Pro XRS system.

FIG. 3 illustrates the error in the height component of synchronous RTK position estimates: 300, 301, 302, 303, . . . 308, for epoch times 0.0, 1.0, 2.0, 3.0, . . . 8.0 seconds respectively. The RTK position fixes: 300, 301, 305, & 306 are considered fixed i.e. have carrier phase ambiguities that are essentially resolved to integer values. The RTK position fixes at: 302, 303, 304, and 308, are considered float solutions, i.e., the carrier phase ambiguities cannot be resolved to integer values. Note that at time 7.0 s, there is no RTK position solution. The precision (uncertainty) of each RTK position fix is represented by a vertical error bar. The fixed heights have better precision (less uncertainty) than the float heights.

Autonomous (point position) solutions are produced by the rover GNSS receiver at say a 10 Hz rate. For clarity, just the 1 Hz autonomous height estimates are shown in FIG. 3, while the intervening autonomous heights are illustrated with a dashed line. The autonomous 1 Hz height estimates are: 310, 311, 312, 313, . . . 318, corresponding to epoch times: 0.0, 1.0, 2.0, 3.0, . . . 8.0 s respectively. Autonomous position estimates generally have a precision of several decimeters up to several meters.

FIG. 4 illustrates the timing of various events relevant to delta phase processing. Time axis 350 represents actual time, with values shown from 1.0 s through to 3.0 s. The rover GNSS receiver measurements are sampled and made available for processing a short time after the actual time. Hence, the rover measurements for epoch 1.0 s are available at event 361.0; the rover measurements for epoch 1.2 s are available at event 361.2; and so on, as shown on axis 360.

Axis 370 corresponds to the time that correction data is received at the rover. The correction data must first be sampled by a real reference station, or a network of reference stations, before being sent and received by the rover, therefore there is an inherent latency in the received correction data. Event 371 corresponds to the receipt of correction data for epoch 1 s; event 372 corresponds to the receipt of correction data for epoch 2 s. Once the correction data is received it can be time-synchronized with rover data. Single-difference observations can be then be formed and a synchronous position solution computed.

The rigorous satellite orbit and clock data is normally derived from a network of spatially distributed reference stations (e.g. a regional, or global network). The network GNSS observations must first be concentrated at a central facility, then processed and finally formatted and distributed to one or more rovers. Hence the rigorous satellite orbit and clock data is often old by the time it reaches the rover(s). Event 381, shown on axis 380, corresponds to rigorous satellite and clock data for time 1.0 s. Once the rigorous satellite orbit and clock data is available at the rover, it can be used to update the time sequence of rover position differences.

SUMMARY

GNSS Processing with Predicted Precise Clocks [TNL A-2796]

Positioning methods and apparatus are presented which use predicted precise GNSS satellite clock error models. GNSS data are derived from signals received at a rover antenna. At least one of correction data and rigorous satellite data are obtained. A time sequence is maintained of at least one rover position and at least one rover position difference with associated time tags. The time sequence is used to determine at least one derived rover position. The derived rover position is reported. A set of GNSS satellite clock error models is maintained. The time sequence is extended upon arrival of rover data associated with a new time tag. At least one clock error model is updated upon arrival of rigorous satellite data.

GNSS Processing with Mixed-Quality Data [TNL A-2798]

Positioning methods and apparatus are presented which use mixed-quality data. GNSS data derived from signals received at a rover antenna are obtained. At least one of correction data and rigorous satellite data is obtained. A time sequence is maintained, of at least one rover position and at least one rover position difference with associated time tags. The time sequence is obtained by estimating at least one position difference using rigorous satellite data from multiple satellites using at least two combinations of data selected from: for at least one satellite, no correction data and broadcast satellite data; for at least one satellite, no correction data and rigorous predicted satellite data, for at least one satellite, no correction data rigorous satellite data for said at least one satellite; for at least one satellite, correction data and broadcast satellite data; for at least one satellite, rigorous predicted satellite data and correction data; and for at least one satellite, rigorous satellite data and correction data. The time sequence is used to determine at least one derived rover position. The derived rover position is reported.

GNSS Processing with Time-Sequence Maintenance [TNL A-3126]

Positioning methods and apparatus are presented which maintain a time sequence. GNSS data derived from signals received at a rover antenna are obtained. At least one of correction data and rigorous satellite data are obtained. A time sequence of at least one rover position and at least one rover position difference with associated time tags is maintained. The time sequence is extended with a computed synchronized position upon arrival of correction data At least a portion of the time sequence is modified upon arrival of one of correction data and rigorous satellite data. The time sequence to determine at least one derived rover position. The derived rover position is reported.

GNSS Processing with Jump Reduction [TNL A-2638]

Reduction of Position Jumps in Low-Latency Solutions

The low-latency position estimates are based on an accumulation of delta positions and the last available synchronous position fix. Each time a new synchronous position fix is available, there is generally a jump in the reported low-latency position fixes. The magnitude of the low-latency position fix jumps is mostly due to the precision of the underlying synchronous position solutions. It is desirable in many applications to produce high update (>1 Hz) position fixes that are not affected by discontinuities caused by jumps in the synchronous position fixes. In particular machine guidance applications benefit from smooth and continuous position input to the control system(s).

Positioning methods and apparatus with jump reduction are presented. A respective synchronous position to be propagated to an anchor epoch is obtained for each epoch of a set of at least one epoch. For each epoch of the set, the respective synchronous position is combined with at least one rover position difference defining a change of rover position from the epoch of the respective synchronous position to the anchor epoch, to obtain a respective propagated position for the anchor epoch. When a synchronous position is obtained for the anchor epoch, at least one propagated position for the anchor epoch is blended with the synchronous position for the anchor epoch to obtain a blended anchor position for the anchor epoch. A propagated rover position is determined for a current epoch by combining the blended anchor position with at least one rover position difference defining a change of rover position from the anchor epoch to the current epoch.

GNSS Processing with Position Blending [TNL A-2797]

Bridging Reference Station Changes

In prior-art Sparse Reference Station (SRS) systems, the rover synchronous GNSS processor is reset whenever the physical reference station changes (International Patent Application PCT/US2011/24733 filed 14 Feb. 2011, International Publication Number WO 2011/126605 dated 13 Oct. 2011 (TNL A-2633PCT). The switch in physical reference station therefore typically leads to a switch from fixed, high quality position solution, to a period of float, low quality position solution, immediately following the physical reference station change. Many high-precision GNSS applications require utmost (cm-level) accuracy and therefore need to wait until the fixed solution quality returns following the physical reference station change. It is advantageous to be able to bridge reference station changes with delta phase processing.

Methods and apparatus for processing of GNSS signal data are presented. GNSS data derived from signals received at a rover antenna are obtained. Correction data are obtained. A time sequence of at least one rover position and at least one rover position difference with associated time tags is maintained. The time sequence is used to determine at least one derived rover position by, starting from a position determined using corrections synchronous with rover data as an anchor position at a time tag, deriving a new anchor position for the time tag of the anchor position and at least one other estimated rover position at the time tag of the anchor position. The new anchor position at the time tag is reported as the rover position at a time associated with the time tag of the anchor position, or the new anchor position at the time tag of the anchor position is combined with at least one rover position difference to determine a new derived rover position for a subsequent time tag, and the new derived rover position is reported as the rover position at a time associated with the subsequent time tag.

GNSS Processing with Starting-Position Correction [TNL A-2705]

Correcting Delta Phase for Incorrect Starting Position

In prior-art delta phase processing schemes, the autonomous position of the rover is used as the linearization point for the delta position computations. Typically the autonomous position of the rover is in error by several decimeters, up to several meters. Large errors in the linearization point leads to a proportional error in the output delta position estimates. The linearization errors accumulate with propagation time, therefore large correction data latency causes increased error growth in the delta position estimates.

Methods and apparatus for processing of GNSS signal data are presented. An approximate rover anchor position for a first epoch is obtained. The approximate rover anchor position is used to determine a rover position difference for at least one succeeding epoch. An improved rover anchor position is obtained for the first epoch. An adjusted rover position difference is derived for each of these succeeding epochs. A rover position for a current epoch is derived from the improved rover anchor position for the first epoch and at least one adjusted rover position difference.

BRIEF DESCRIPTION OF THE DRAWING FIGURES

Detailed description of embodiments in accordance with the invention are provide below with reference to the drawing figures, in which:

FIG. 1 schematically illustrates a scenario using a GNSS rover with correction data for point surveying;

Figure 6:
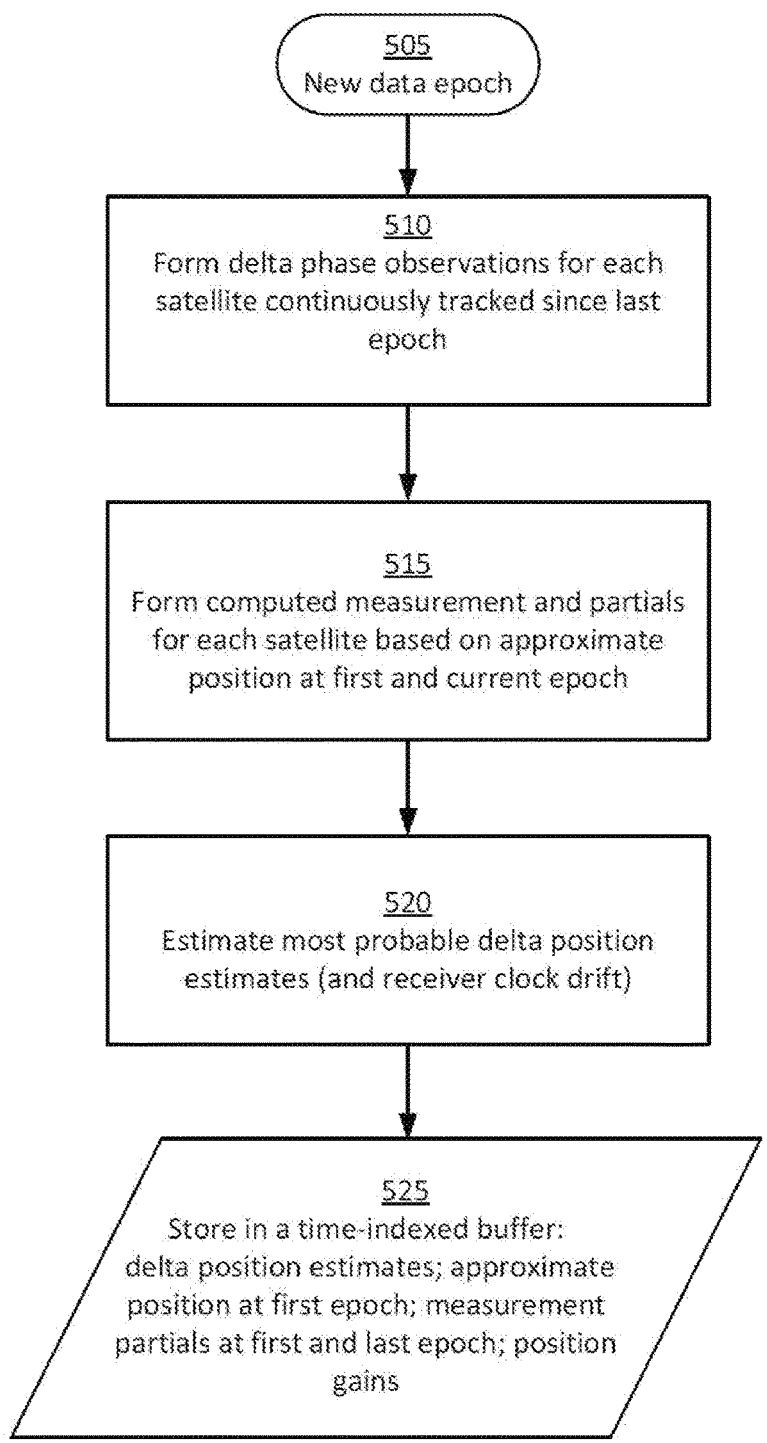
Figure 7:
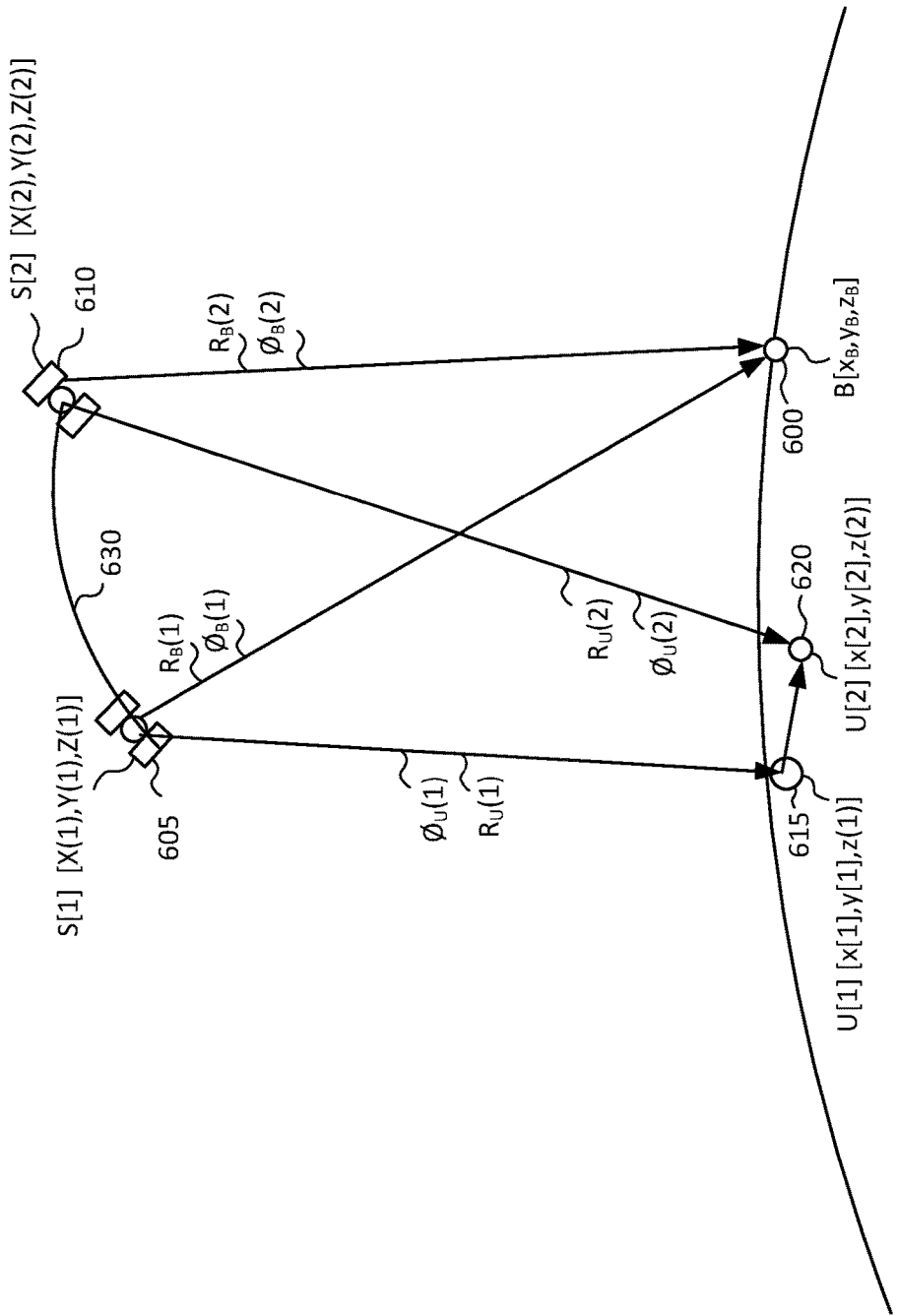
Figure 8:
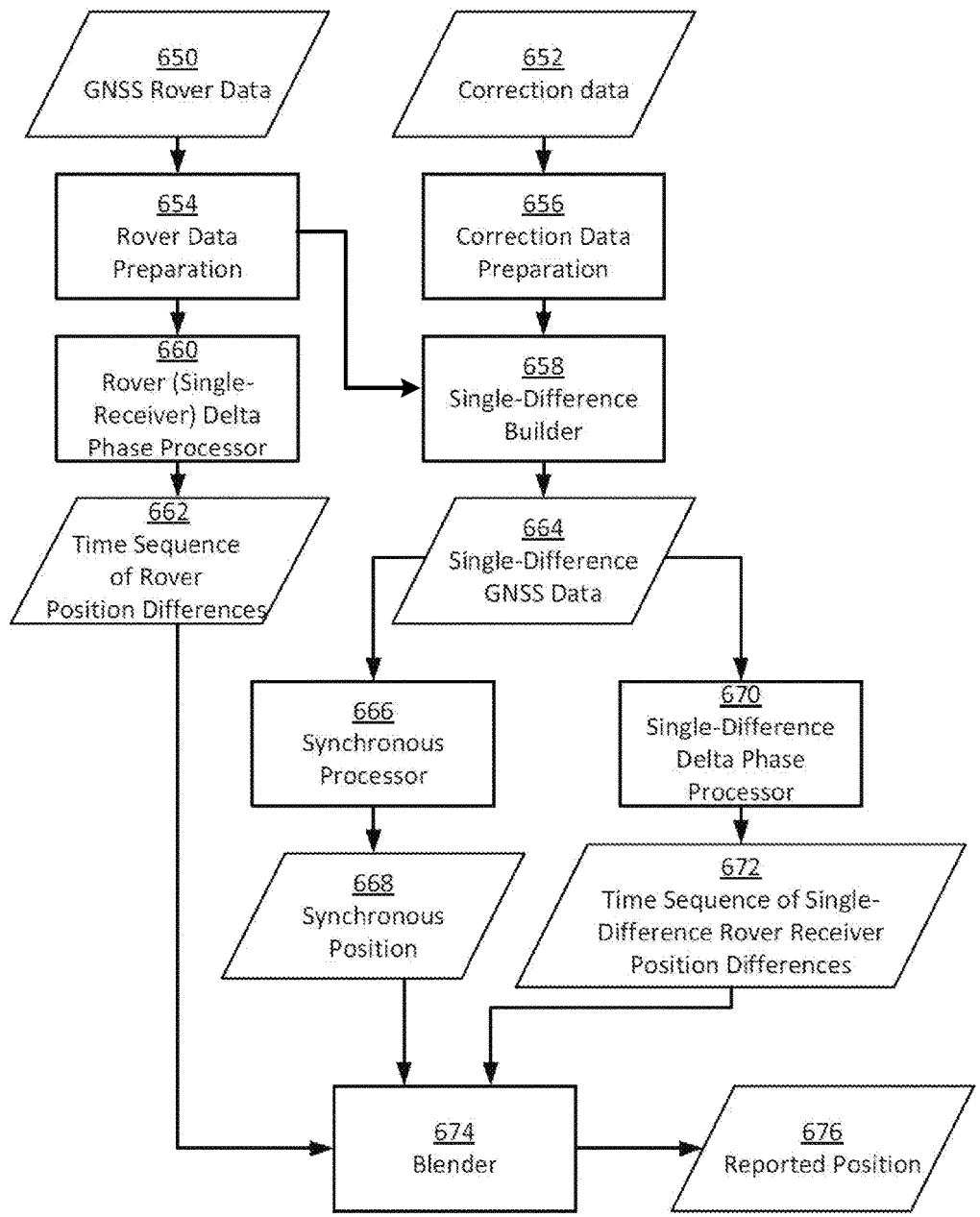
Figure 9:
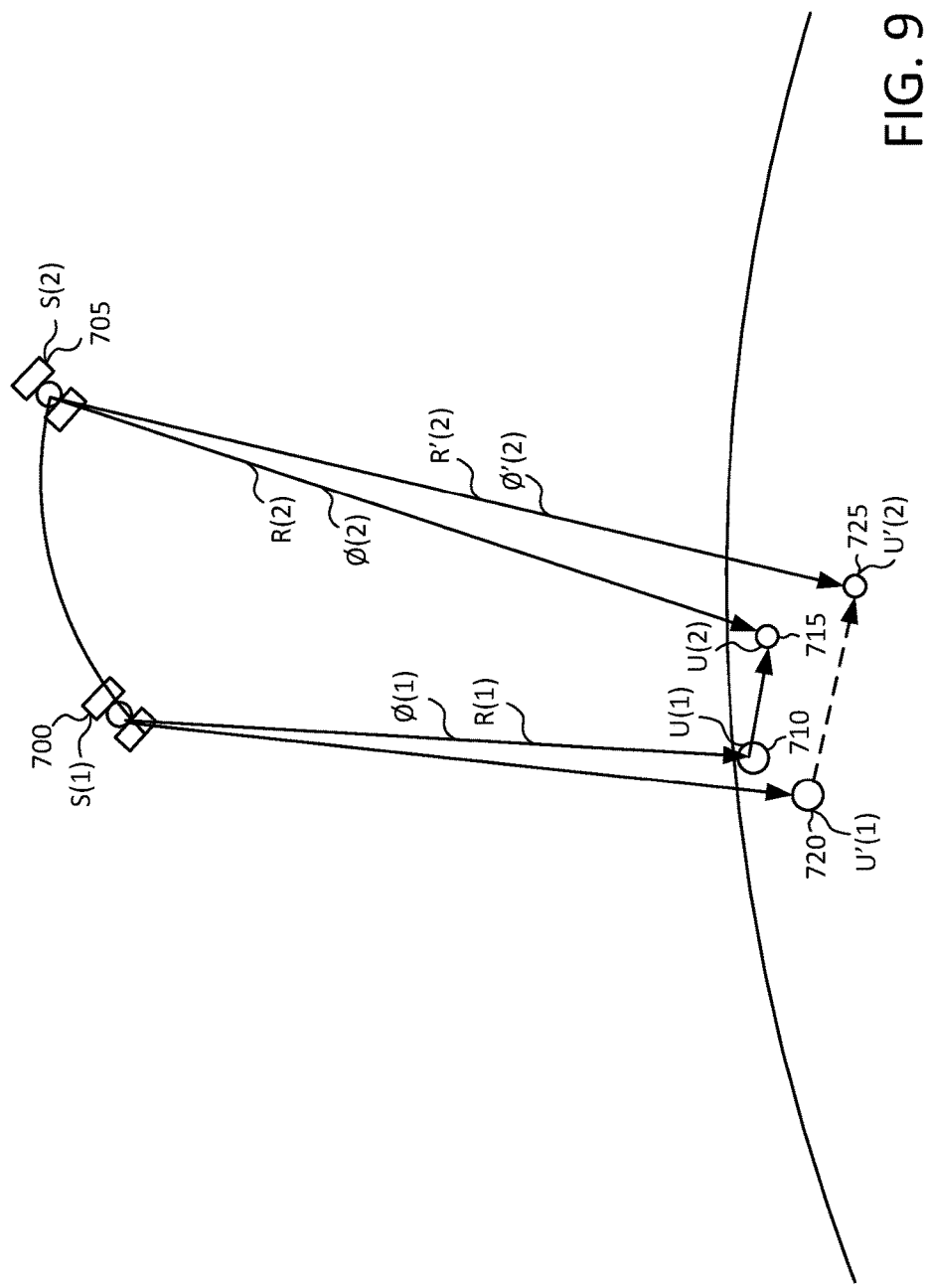
Figure 10:
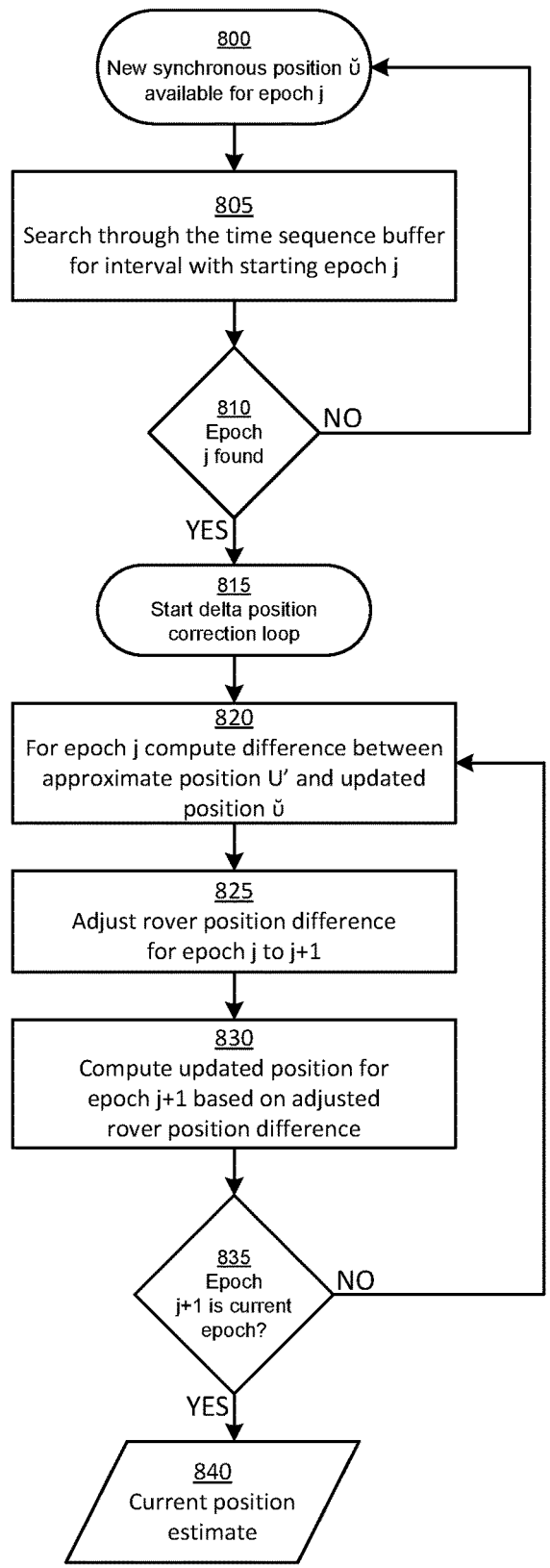
Figure 11:
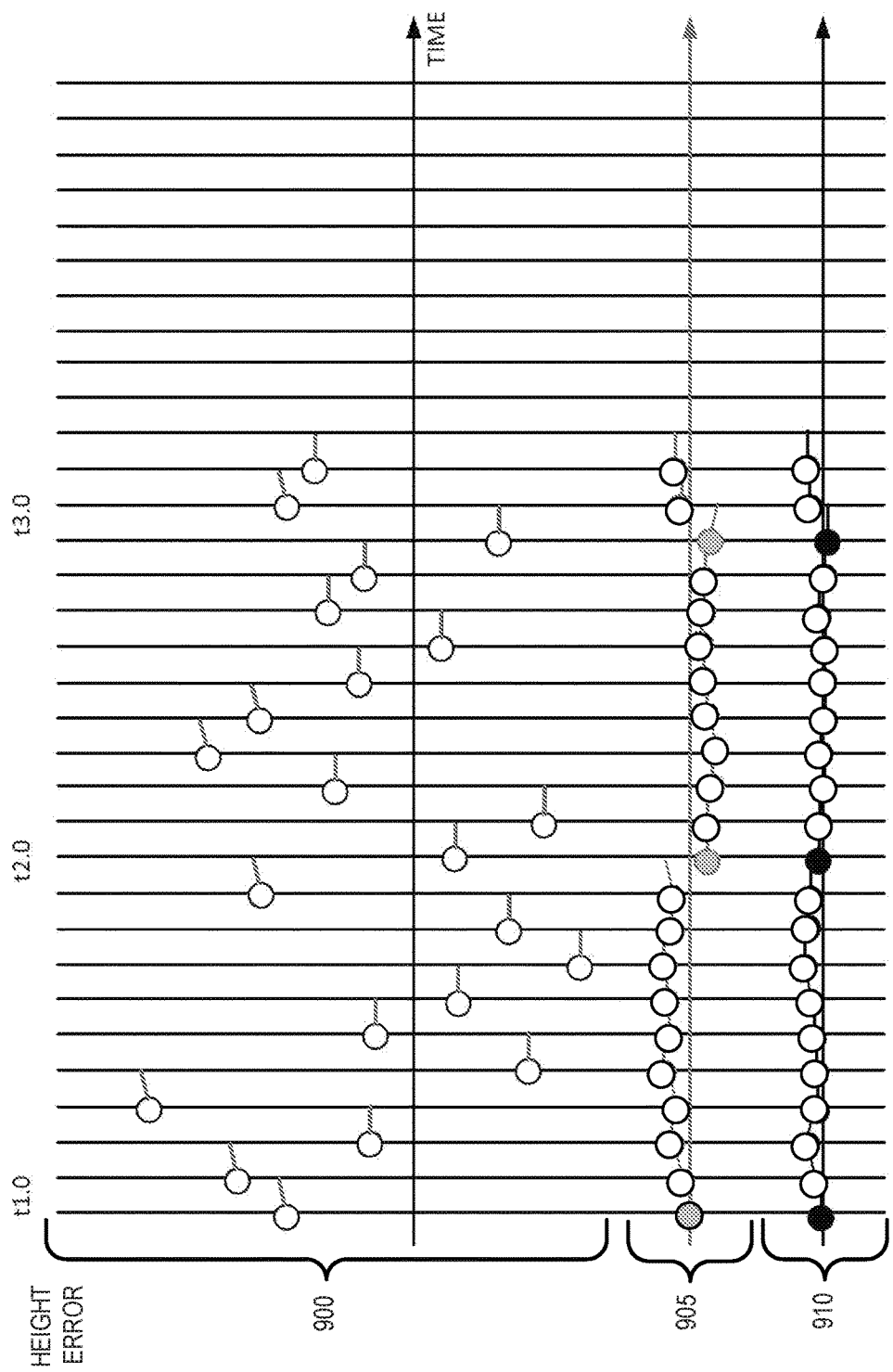
Figure 12:
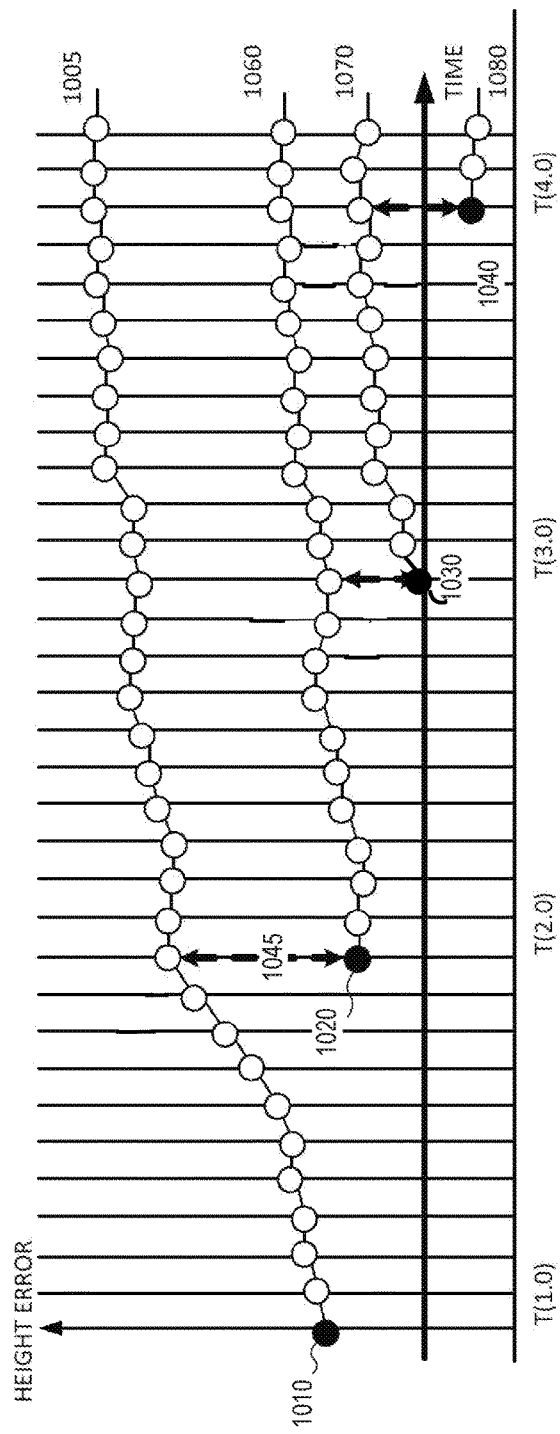
Figure 13:
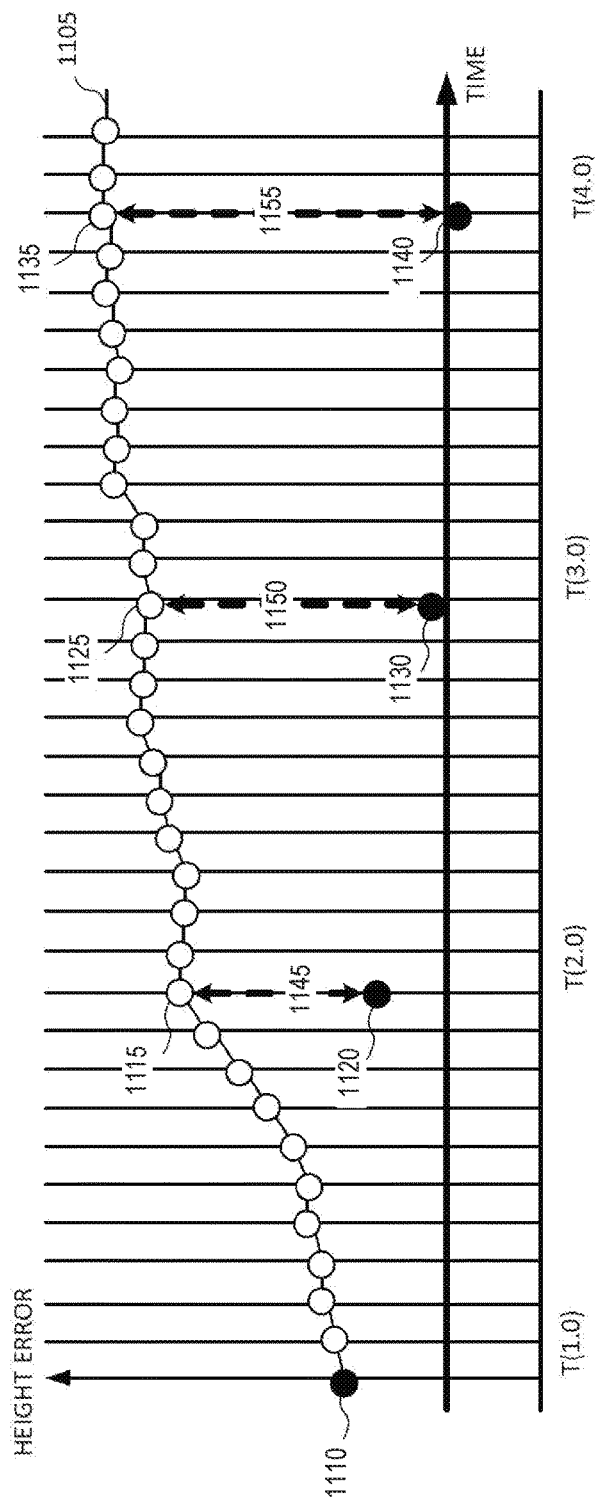
Figure 14:
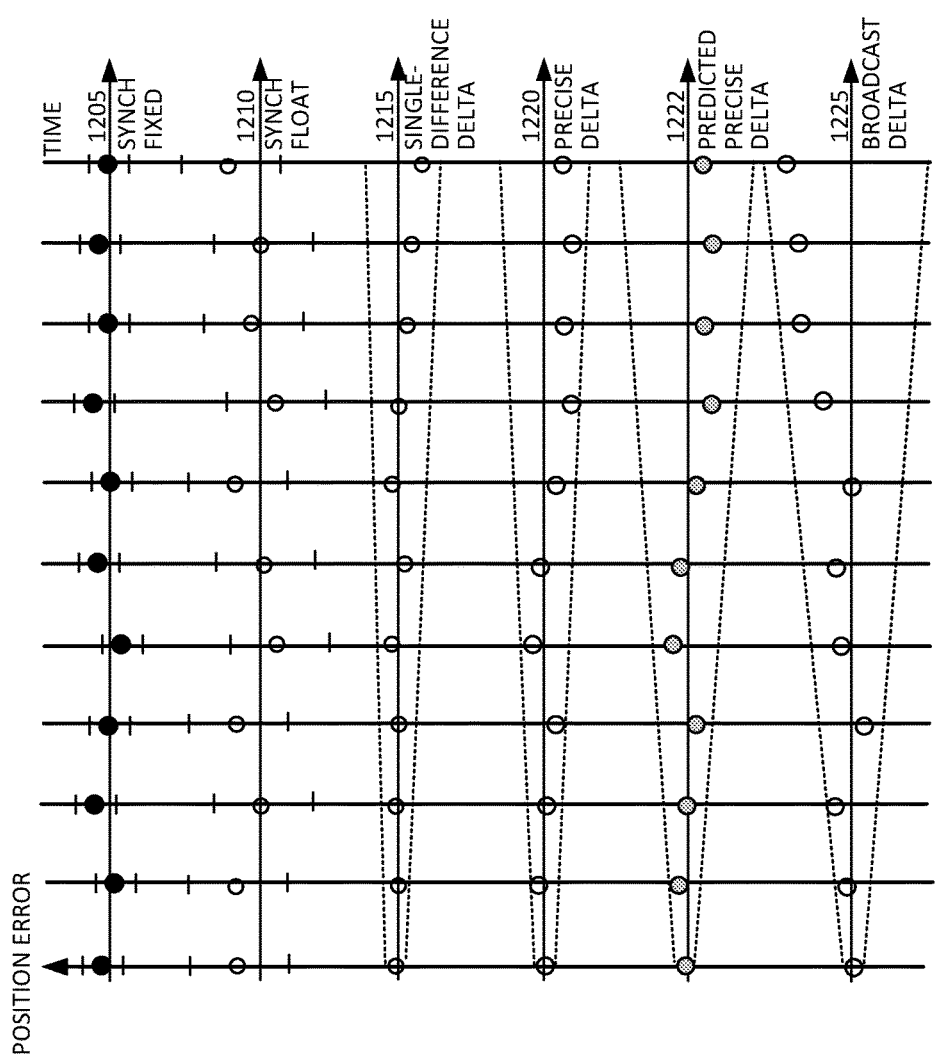
Figure 15:
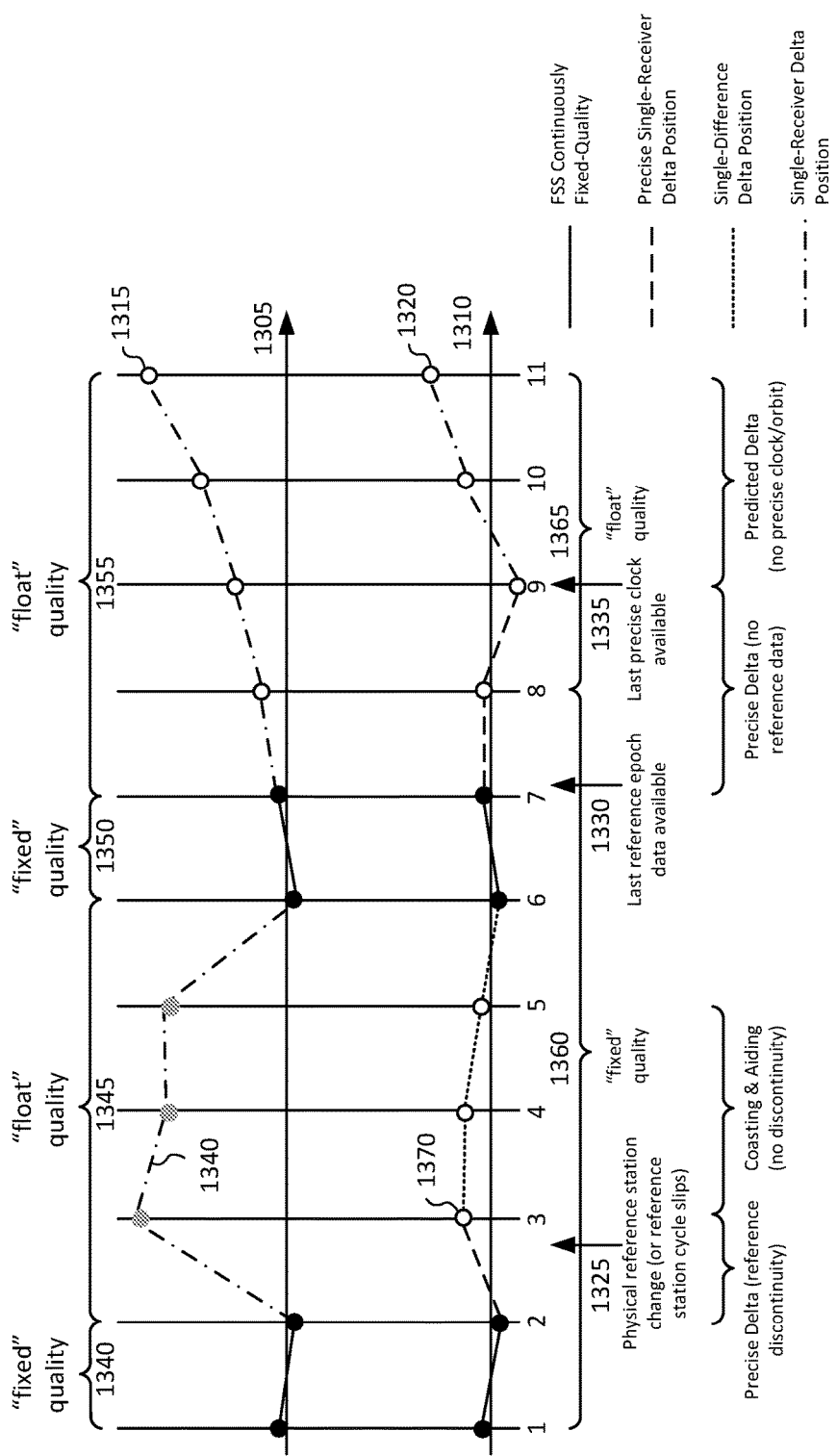
Figure 16:
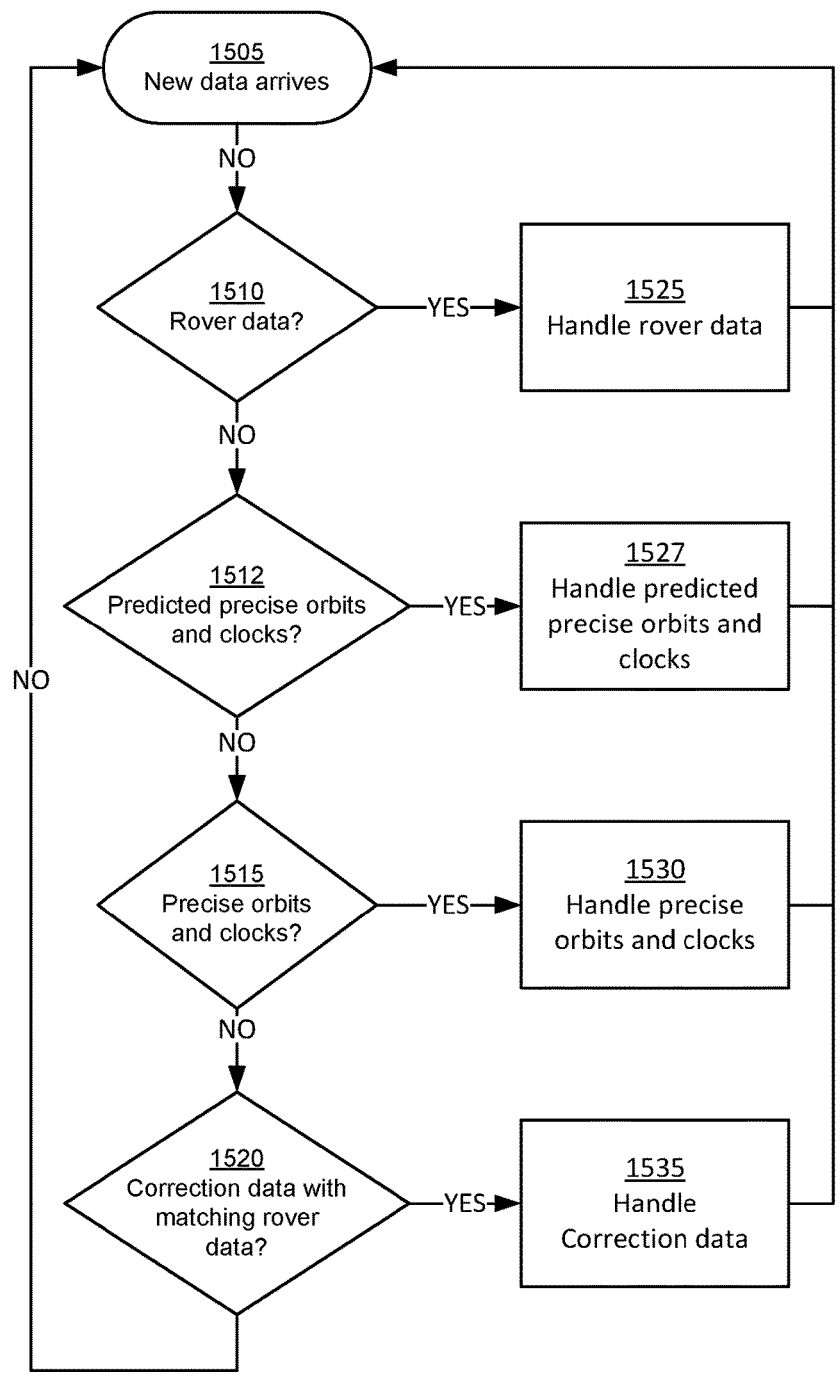

FIG. 6 describes the processing steps required to form a rover position difference between two epochs;

FIG. 7 illustrates a rover receiver at two consecutive epochs;

FIG. 8 is a block diagram illustrating components of a GNSS data processing scheme;

FIG. 9 shows true rover positions at a first and a second epoch;

FIG. 10 is a flowchart of a procedure for adjusting delta position estimates for errors in initial coordinates;

FIG. 11 depicts adjustment for initial position errors;

FIG. 12 illustrates a 10 Hz rover position difference trajectory;

FIG. 13 illustrates a 4s rover position difference trajectory;

FIG. 14 illustrates relative uncertainties of various solutions types over time;

FIG. 15 presents timeline views of positions (height component only) derived from various techniques;

FIG. 16 presents a flowchart that explains the handling of data at a rover; and

Figure 17:
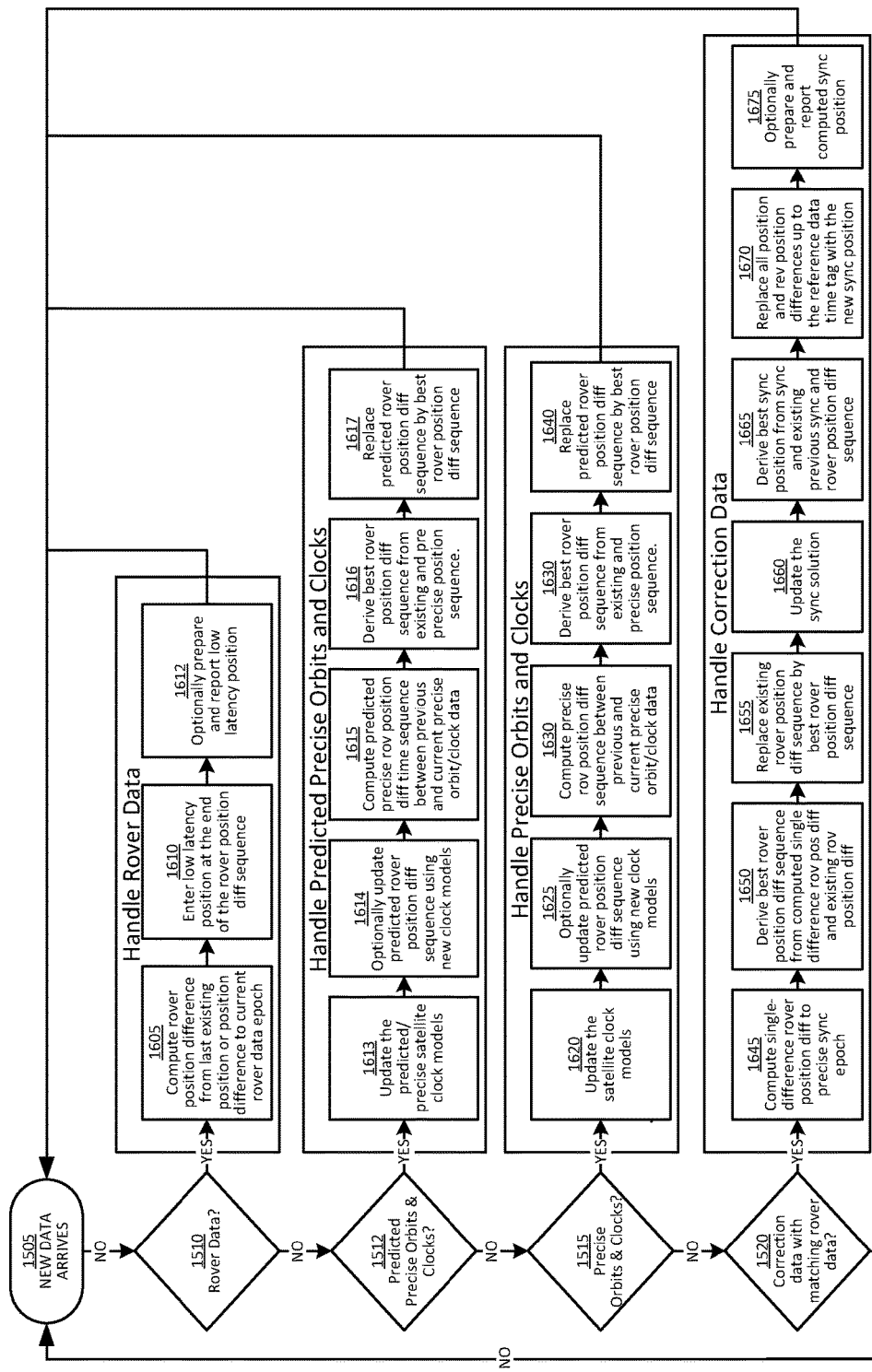

FIG. 17 shows an expanded view of the flowchart of FIG. 16.

DETAILED DESCRIPTION

Introduction—Delta Phase Principles

Figure 1:
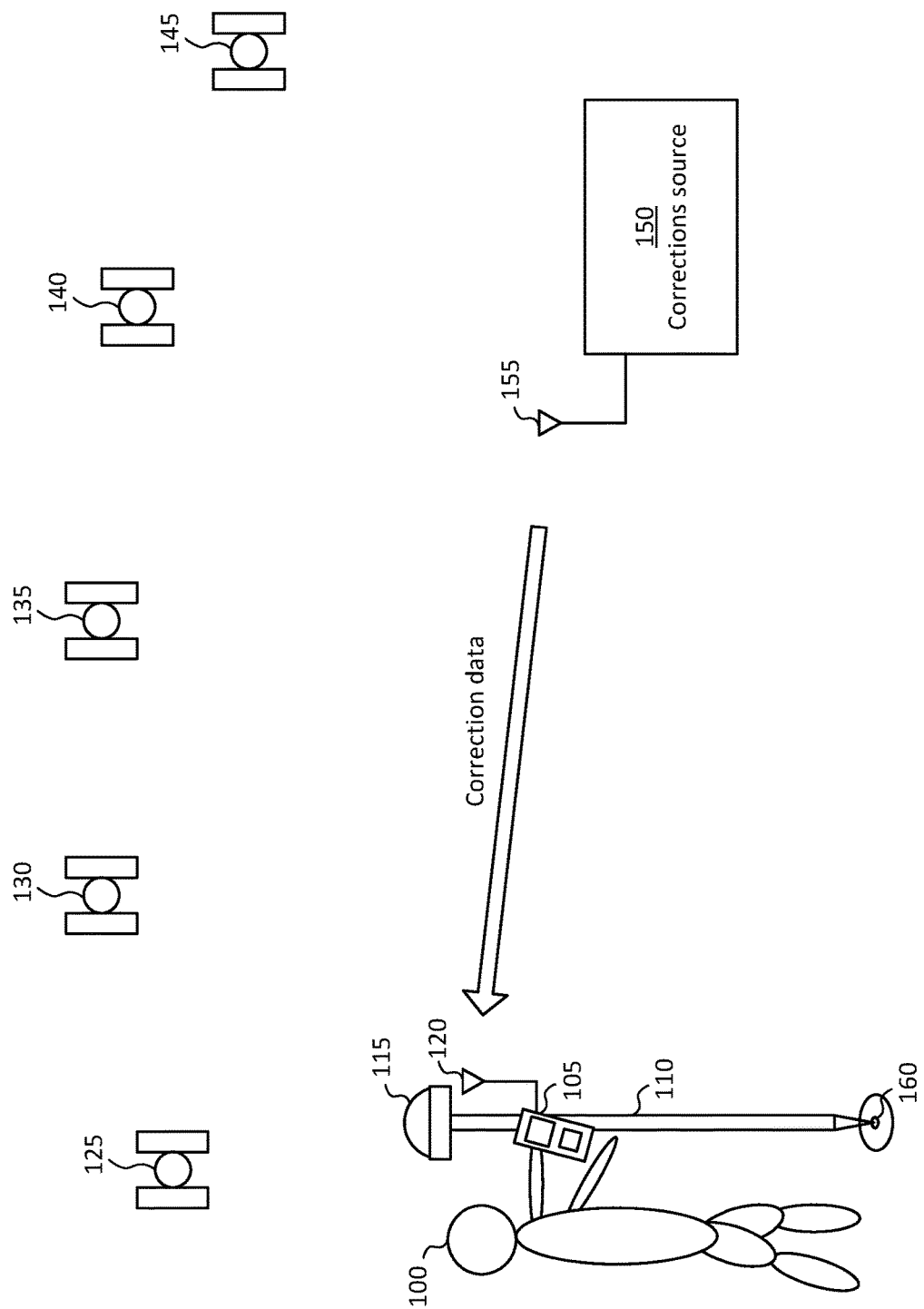
Figure 2:
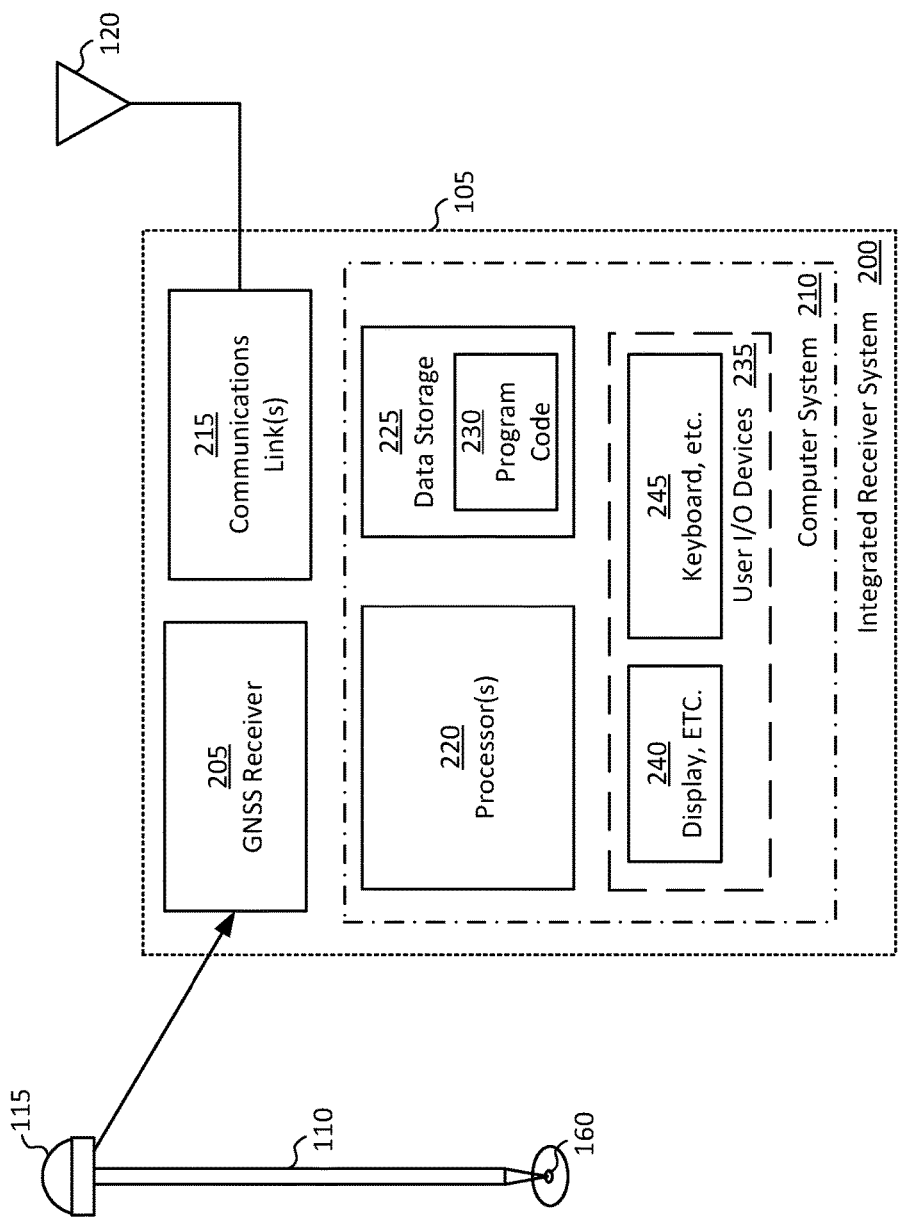
FIG. 2 is a block diagram of an integrated GNSS receiver system.
Figure 3:
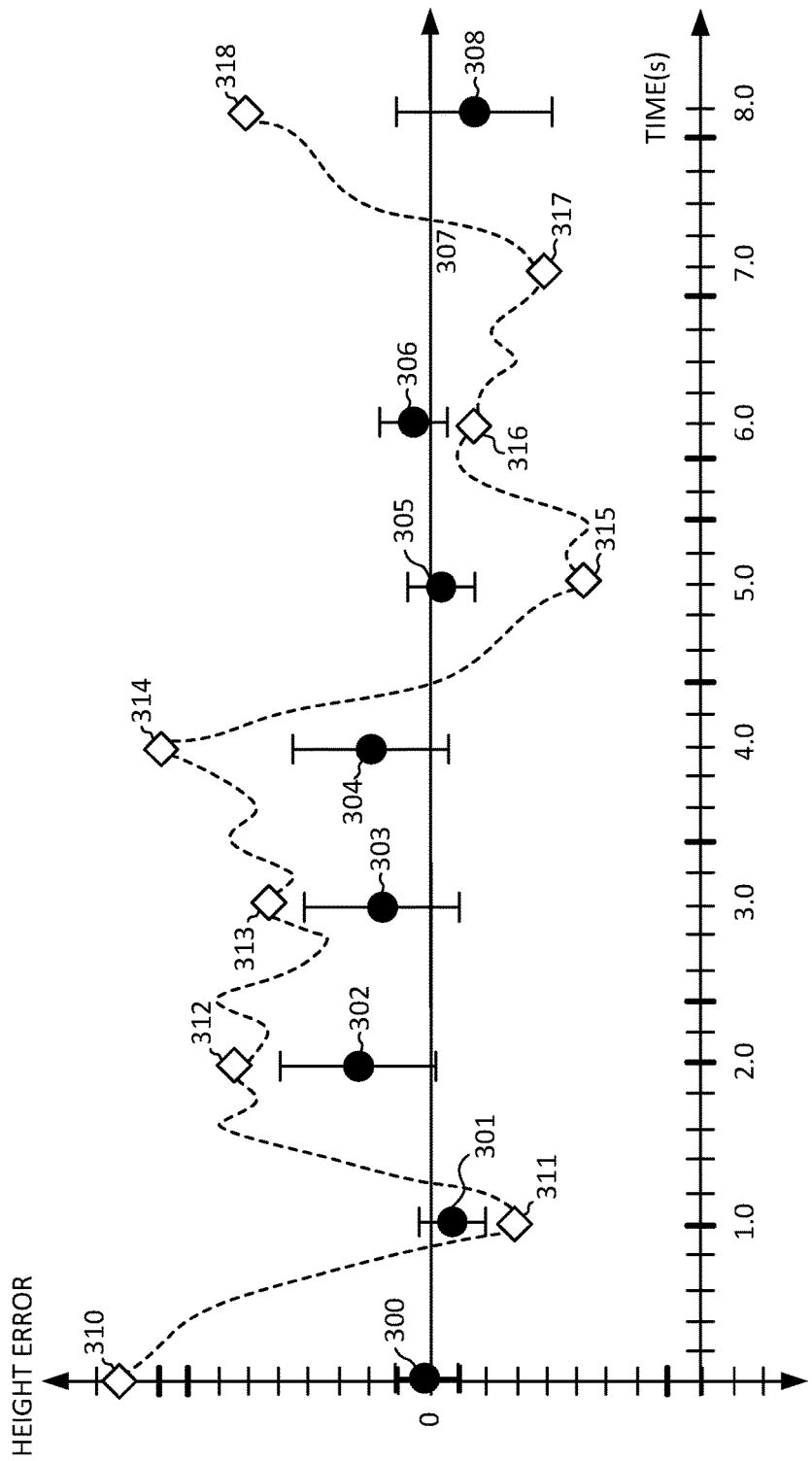
FIG. 3 illustrates the error in the height component of synchronous RTK position estimates.
Figure 4:
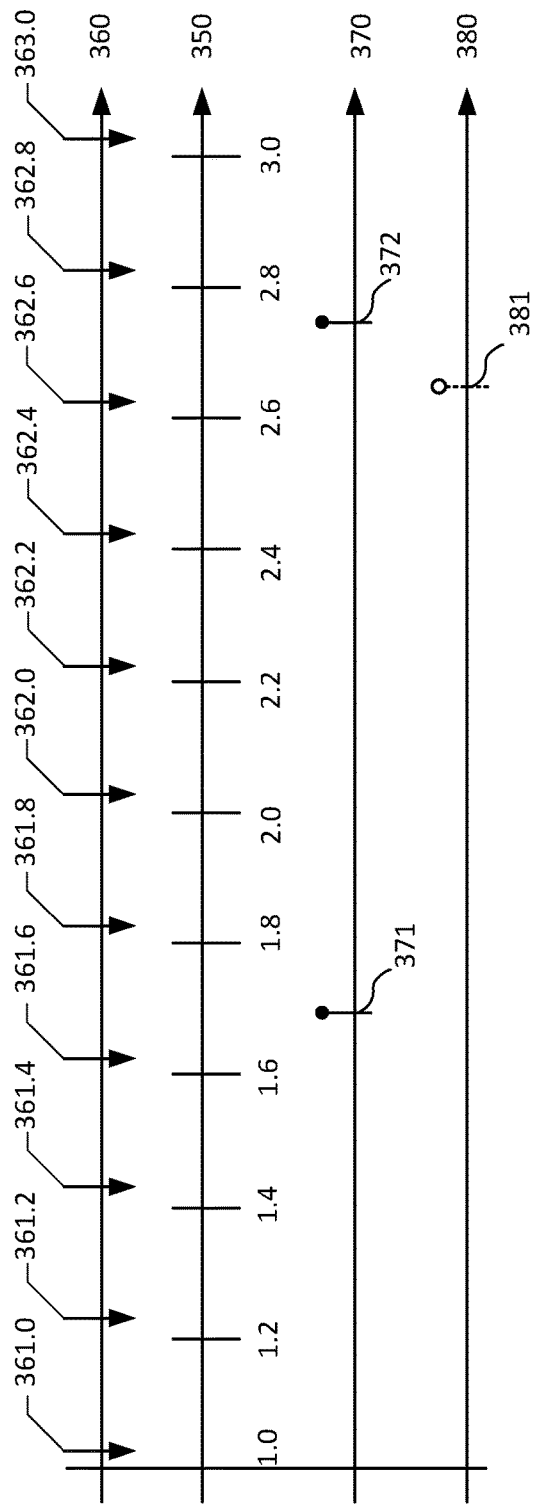
FIG. 4 illustrates the timing of various events relevant to delta phase processing.
Figure 5:
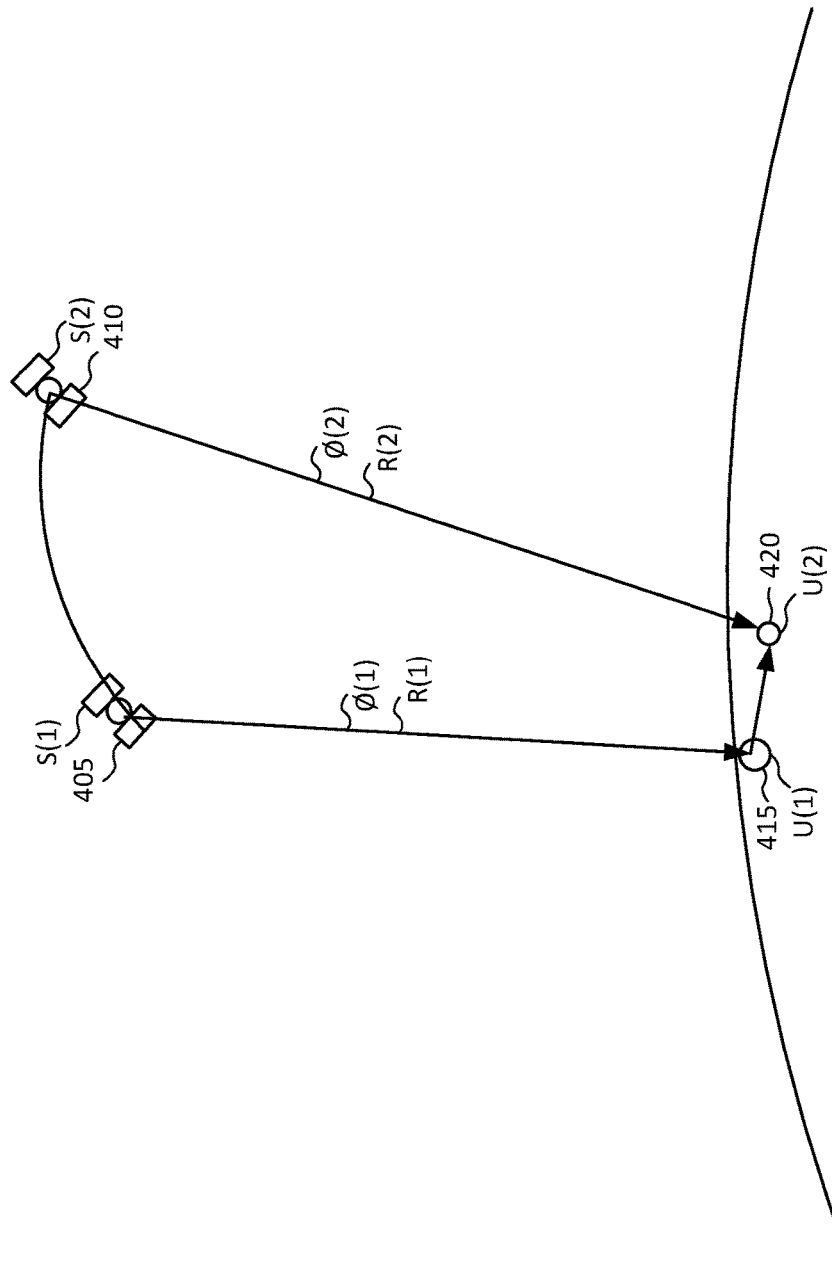
FIG. 5 illustrates an orbiting GNSS satellite.

Delta phase is defined here as being the difference in carrier phase observed to a GNSS satellite over a specific time interval. GNSS carrier phase measurements observed by a receiver to a GNSS satellite have millimeter precision, however the measurements are affected by a number of biases. If carrier phase tracking is maintained, the delta phase measurements give a precise measure of the change in range (distance) between user and satellite over time. FIG. 5 illustrates an orbiting GNSS satellite at locations S(1), and S(2), denoted 405 and 410, at times t(1) and t(2) respectively.

The user is located at positions U(1) and U(2), denoted 415 and 420, at times t(1) and t(2) respectively. The ranges from user to satellite at the two epochs are R(1) and R(2) respectively. In this example, the observed phase measurements $\phi(1)$ and $\phi(2)$ (given in meters) are free from errors and therefore are equal to the true ranges R(1) and R(2) respectively.

The delta phase measurement (in units of meters), for epoch 1.0 s to 2.0 s, is defined as:

$$\delta\phi(1,2) \overset{def}{=} \phi(2) - \phi(1) \qquad (1)$$

The delta phase measurement for the error-free example is equal to the (true) delta range measurement (i.e. $\delta\phi(1,2)=\delta R(1,2)$):

$$\delta R(1,2)=R(2)-R(1) \qquad (2)$$

The range (at epoch k) is related to the user and satellite coordinates via the following:

$$R(k)=\sqrt{[X(k)-x(k)]^2+[Y(k)-y(k)]^2+[Z(k)-z(k)]^2} \qquad (3)$$

The satellite coordinates S(k)=[X(k), Y(k), Z(k)] are known from a broadcast or rigorous satellite ephemeris. The user coordinates U(k)=[x(k), y(k), z(k)] are the only unknown quantities in (3). If delta phase is observed to at least 3 satellites, the corresponding change in user location can be derived for the same time interval. In practice, a forth satellite must be observed in order to estimate the change in receiver clock over the delta phase time interval.

Delta Phase Observation Equation

The single receiver phase observation equation forms the basis of the delta phase observation equation and therefore is presented first. The following single receiver phase observation equation applies to a single receiver observation to a single satellite:

$$\phi(k) = R(k) + T(k) + P(k) - \tau(k) + \beta(k) + \frac{I(k)}{f^2} + \omega(k) + N \qquad (4)$$

where:
k denotes the epoch time,
$\phi(k)$ carrier phase measurement,
R(k) true user-satellite range,
T(k) satellite clock error,
P(k) satellite ephemeris error,
$\tau(k)$ receiver clock error,
$\beta(k)$ tropospheric error,
I(k) ionospheric error,
f frequency of the carrier signal,
$\omega(k)$ carrier phase multipath error,
N integer carrier phase ambiguity term.

Note that for the purposes of brevity, the satellite index is omitted in Equation (4).

The delta phase observation equation is formed by differencing (4) with respect to time:

$$\delta\phi(k,l) = \delta\phi(l) - \delta\phi(k) = \delta R(k,l) + \delta T(k,l) + \qquad (5)$$
$$\delta P(k,l) + \delta\tau(k,l) + \delta\beta(k,l) + \frac{\delta I(k,l)}{f^2} + \delta\omega(k,l)$$

Note that the carrier phase ambiguity term is absent from the delta phase observation equation, this is because under continuous phase tracking, N(k)=N(i) and therefore this term cancels out. The remaining components on the right-hand side (RHS) of Equation (5) are simply time-differenced equivalents of those terms in Equation (4).

The user location parameters of interest are contained within the range difference term $\delta R(k,l)$:

$$\delta R(k,l) = \sqrt{[X(l)-x(l)]^2+[Y(l)-y(l)]^2+[Z(l)-z(l)]^2} - \qquad (6)$$
$$\sqrt{[X(k)-x(k)]^2+[Y(k)-y(k)]^2+[Z(k)-z(k)]^2}$$

Assuming that the location of the user [x(k), y(k), z(k)] is known at epoch k, and remembering that the satellite coordinates [X(k), Y(k), Z(k); X(l), Y(l), Z(l)] are known at t(k) and t(l), the only unknowns in (5) are the user coordinates [x(l), y(l), z(l)] at epoch l, and the receiver clock drift between epochs k and l, i.e.:

$$\delta\phi(k,l)=f\{x(l),y(l),z(l),\delta\tau(k,l)\} \qquad (7)$$

A Taylors series expansion can be used to linearly relate the unknowns to the observations:

$$\delta\phi(k,l) = f\{\tilde{x}(l), \tilde{y}(l), \tilde{z}(l), \delta\tilde{\tau}(k,l)\} + \frac{\partial f}{\partial x(l)}\Delta x(l) + \qquad (8)$$
$$\frac{\partial f}{\partial y(l)}\Delta y(l) + \frac{\partial f}{\partial z(l)}\Delta z(l) + \frac{\partial f}{\partial \delta\tau(k,l)}\Delta\delta\tau(k,l)$$

where:
  f{$\tilde{x}(l)$, $\tilde{y}(l)$, $\tilde{z}(l)$, $\tilde{\delta\tau}(k,l)$} delta phase evaluated with approximate unknowns [x(l)=$\tilde{x}(l)$; y(l)=$\tilde{y}(l)$; z(l)=$\tilde{z}(l)$; $\delta\tau(k,l)$=$\tilde{\delta\tau}(k,l)$];

$$\frac{\partial f}{\partial x(l)}$$

derivative of the range-difference w.r.t. $x_l$;
  Δx(l) correction to the approximate x-coordinate;
  with analogous definitions for the y and z parameters in (8);

$$\frac{\partial f}{\partial \delta\tau(k,l)}$$

derivative w.r.t. the receiver clock drift;
  Δδτ(kl) correction to the approximate receiver clock drift.
  Delta phase observations for each of s satellites tracked continuously over times t(k) to t(1) can be written in linearised vector form as follows:

$$m(k,l)+v(k,l)=A(l)x(k,l) \quad (9)$$

or in expanded matrix form as:

$$\begin{bmatrix} \delta\phi^1(k,l) - f^1[\tilde{x}(l),\tilde{y}(l),\tilde{z}(l),\tilde{\delta\tau}(k,l)] \\ \delta\phi^2(k,l) - f^2[\tilde{x}(l),\tilde{y}(l),\tilde{z}(l),\tilde{\delta\tau}(k,l)] \\ \ldots \\ \delta\phi^s(k,l) - f^s[\tilde{x}(l),\tilde{y}(l),\tilde{z}(l),\tilde{\delta\tau}(k,l)] \end{bmatrix} + \begin{bmatrix} v^1(k,l) \\ v^2(k,l) \\ \ldots \\ v^s(k,l) \end{bmatrix} = \quad (10)$$

$$\begin{bmatrix} \partial f^1/dx(l) & \partial f^1/dy(l) & \partial f^1/dz(l) & 1 \\ \partial f^2/dx(l) & \partial f^2/dy(l) & \partial f^2/dz(l) & 1 \\ \ldots & \ldots & \ldots & \ldots \\ \partial f^s/dx(l) & \partial f^s/dy(l) & \partial f^s/dz(l) & 1 \end{bmatrix} \begin{bmatrix} \Delta x(l) \\ \Delta y(l) \\ \Delta z(k,l) \\ \Delta \delta\tau(k,l) \end{bmatrix}$$

where:
  m(k,l) (s×1) vector of observed minus computed delta phase measurements;
  v(k,l) (s×1) vector of residual terms corresponding to each delta phase observation;
  A(l) (s×4) coefficient matrix containing the measurement partial derivatives;
  x(k,l) (4×1) state parameter vector containing corrections to the approximate unknowns.

The covariance matrix of the delta phase observations is required in the estimation process:

$$Q_{\delta\phi(k,l)} = \begin{bmatrix} \sigma^2_{\delta\phi^1(k,l)} & 0 & .. & 0 \\ 0 & \sigma^2_{\delta\phi^2(k,l)} & .. & 0 \\ .. & .. & .. & .. \\ 0 & 0 & .. & \sigma^2_{\delta\phi^s(k,l)} \end{bmatrix} \quad (11)$$

where:
  $\tau_{\delta\phi^i(k,l)}^2$ variance of the delta phase observation to satellite i.

Note that the delta phase observations to each satellite are considered as being uncorrelated, hence the diagonal nature of $Q_{\delta\phi(k,l)}$.

Estimation of Rover Position Difference Using Delta Phase

Well known least squares or Kalman filter estimation techniques can be used to compute rover position difference (delta position) estimates. For least squares estimation, the solution for the unknown parameters is given by:

$$\hat{x}(k,l)=(A(l)^T Q_{\delta\phi(k,l)}^{-1} A(l))^{-1}(A(l)^T Q_{\delta\phi(k,l)}^{-1} m(k,l))\hat{x}$$
$$(k,l)=G(k,l)m(k,l) \quad (12)$$

where:
  $\hat{x}(k,l)$ (4×1) vector containing the most probable values for the corrections to the approximate parameters;
  $Q_{\delta\phi(k,l)}^{-1}$ (s×s) observation weight matrix, equal to the inverse measurement covariance matrix;
  G(k,l) (4×s) gain matrix which relates a change in a measurement to a change in the estimated parameters.

Anchor Position

Rover position differences only provide an estimate of the relative trajectory of the rover over time. An anchor position (absolute position) is needed to convert the relative changes in position into more useful absolute rover positions. The anchor position normally takes the form of a synchronous position, derived from processing single-difference rover and correction data in a filtering scheme that estimates rover position, phase ambiguities and other nuisance parameters. However it is possible to make use of DGPS, conventional survey methods, inertial navigation systems, etc., to produce a suitable anchor position. The inherent accuracy of the reported rover position is only as good as the underlying anchor position.

Rover Position Difference Processing Steps

FIG. 6 describes the processing steps required to form a rover position difference between two epochs. Table 1 illustrates a time sequence of rover position differences buffered for high rate (say 5 Hz) delta phase processing. Table 2 illustrates a time sequence of rover position differences buffered for low rate (1 Hz) delta phase processing. Note that the time sequences are normally implemented as circular buffers, indexed with time.

The processing steps are described in detail as follows:
1. For each new data epoch t(l) (Step 505);
2. At 510, carrier phase observations generated at the rover are time-differenced w.r.t. to the last data epoch t(k). Note that only those satellites that were continuously tracked are used in the formation of delta phase observations;
3. At 515, the approximate rover position at the current epoch U'(l) [x(l), y(l), z(l)] is taken from the rover receiver autonomous position solution, or differential position solution.
4. The approximate current position U'(l) [x(l), y(l), z(l)] is used to generate coordinate partials [see (6)-(10)] for each measurement. While the approximate current and first epoch positions are used in the formation of the computed (theoretical) delta phase measurement for each satellite. The precision of the approximate rover coordinates is dependent on the source. For example autonomous position estimates are generally good to meter-level, although in poor tracking environments tens of meters of error may result. Inaccuracies in the approximate positions lead to errors in the computed delta position, which is explained in detail later.
5. At 520, the most-probable rover position difference and receiver clock drift are computed using least squares (12) or comparable estimation methods.

6. Store the time sequence of rover position differences to either the high-rate, or low-rate buffer (525). The time sequence buffers may include:
   rover position difference estimates,
   measurement partials at first and last epochs;
   position gains;
   statistics representing the formal precision of the rover position difference estimates;
   satellites tracked over the time interval;
   approximate position at first epoch used to form partials and computed measurements.
7. The rover position difference results are combined with latent synchronous rover position solutions. The time sequence of rover position difference estimates allow for retrieval and synchronization of the results.
8. Return to step 1 for the next data epoch.

Carrier phase measurements observed at the rover are given by $\phi_U(1)$ and $\phi_U(2)$, for epochs 1 and 2 respectively. The corresponding user-satellite ranges are given by $R_U(1)$ and $R_U(2)$ respectively. Carrier phase measurements observed at the reference are given by $\phi_B(1)$ and $\phi_B(2)$ for epochs 1 and 2 respectively; with corresponding user-satellite ranges: $R_B(1)$ and $R_B(2)$ respectively. It should be noted that in FIG. 7, a physical reference receiver is shown and is used for single-difference formation. However, in the following single-difference delta phase developments, without loss of generality, the reference can be either physical, or virtual. For virtual reference station processing, a synthetic reference correction data stream is produced which mimics that of a physical reference.

TABLE 1

Time sequence of rover position differences at high rate (5 Hz).

| First Epoch | Second Epoch | Rover Position Diff | Measurement Partials at first and second epoch | Position Gains | Statistics | Num Sats | Approx. Position at First Epoch |
|---|---|---|---|---|---|---|---|
| 1.0 | 1.2 | x(1.0, 1.2) y(1.0, 1.2) z(1.0, 1.2) | A(1.0), A(1.2) | G(1.0, 1.2) | $Q_i$(1.0, 1.2) | 6 | $\tilde{x}$ (1.0) $\tilde{y}$ (1.0) $\tilde{z}$ (1.0) |
| 1.2 | 1.4 | x(1.2, 1.4) y(1.2, 1.4) z(1.2, 1.4) | A(1.2), A(1.4) | G(1.2, 1.4) | $Q_i$(1.2, 1.4) | 6 | $\tilde{x}$ (1.2) $\tilde{y}$ (1.2) $\tilde{z}$ (1.2) |
| 1.4 | 1.6 | x(1.4, 1.6) y(1.4, 1.6) z(1.4, 1.6) | A(1.4), A(1.6) | G(1.4, 1.6) | $Q_i$(1.4, 1.6) | 6 | $\tilde{x}$ (1.4) $\tilde{y}$ (1.4) $\tilde{z}$ (1.4) |
| 1.6 | 1.8 | x(1.6, 1.8) y(1.6, 1.8) z(1.6, 1.8) | A(1.6), A(1.8) | G(1.6, 1.8) | $Q_i$(1.6, 1.8) | 6 | $\tilde{x}$ (1.6) $\tilde{y}$ (1.6) $\tilde{z}$ (1.6) |
| 1.8 | 2.0 | x(1.8, 2.0) y(1.8, 2.0) z(1.8, 2.0) | A(1.8), A(2.0) | G(1.8, 2.0) | $Q_i$(1.8, 2.0) | 6 | $\tilde{x}$ (1.8) $\tilde{y}$ (1.8) $\tilde{z}$ (1.8) |
| 2.0 | 2.2 | x(2.0, 2.2) y(2.0, 2.2) z(2.0, 2.2) | A(2.0), A(2.2) | G(2.0, 2.2) | $Q_i$(2.0, 2.2) | 7 | $\tilde{x}$ (2.0) $\tilde{y}$ (2.0) $\tilde{z}$ (2.0) |
| ... | ... | ... | ... | ... | ... | ... | ... |

TABLE 2

Time sequence of rover position differences at low rate (1 Hz).

| First Epoch | Second Epoch | Rover Position Difference | Measurement Partials at first and second epoch | Position Gains | Statistics | Num Sats | Approx. Position at First Epoch |
|---|---|---|---|---|---|---|---|
| 1.0 | 2.0 | x(1.0, 2.0) y(1.0, 2.0) z(1.0, 2.0) | A(1.0), A(2.0) | G(1.0, 2.0) | $Q_i$(1.0, 2.0) | 6 | $\tilde{x}$ (1.0) $\tilde{y}$ (1.0) $\tilde{z}$ (1.0) |
| 2.0 | 3.0 | x(2.0, 3.0) y(2.0, 3.0) z(2.0, 3.0) | A(2.0), A(3.0) | G(2.0, 3.0) | $Q_i$(2.0, 3.0) | 7 | $\tilde{x}$ (2.0) $\tilde{y}$ (2.0) $\tilde{z}$ (2.0) |
| 3.0 | 4.0 | x(3.0, 4.0) y(3.0, 4.0) z(3.0, 4.0) | A(3.0), A(4.0) | G(3.0, 4.0) | $Q_i$(3.0, 4.0) | 7 | $\tilde{x}$ (3.0) $\tilde{y}$ (3.0) $\tilde{z}$ (3.0) |
| ... | ... | ... | ... | ... | ... | ... | ... |

Single-Difference Delta Phase

FIG. 7 illustrates a rover receiver at two consecutive epochs 615 and 620 respectively, tracking a single satellite. The satellite moves along orbit 630 and is located at 605, denoted S(1), at epoch 1, and 610, denoted S(2), at epoch 2. A stationary reference receiver 600, denoted B, tracks the same satellite as the rover. The location of the reference receiver is given in Cartesian coordinates as $(x_B, y_B, z_B)$.

Single-difference observations are formed by subtracting time-synchronized reference/rover measurements taken to a common satellite:

$$\delta\Delta\phi(k,l) = \delta\phi_U(l) - \delta\phi_B(l)) - (\delta\phi_U(k) - \delta\phi_B(l)) = \delta\Delta\phi(l) - \delta\Delta\phi(k) \quad (13)$$

where:
$\delta\phi_U(l)$ delta phase observation for the rover receiver at epoch l,
$\delta\phi_B(k)$ delta phase observation for the reference receiver at epoch k, etc.
$\Delta$ indicates a difference operation between reference (B) and rover (U) quantities.

The single-difference delta phase observation equation follows from (5):

$$\delta\Delta\phi(k, l) = \qquad (14)$$
$$\delta\Delta R(k, l) + \delta\Delta P(k, l) - \delta\Delta\tau(k, l) + \delta\Delta\beta(k, l) + \frac{\delta\Delta I(k, l)}{f^2} + \delta\Delta\omega(k, l)$$

The advantages of using single-difference observations over undifferenced (single receiver) observations include:
  Satellite clock errors are eliminated;
  Satellite orbital errors are reduced proportionally to the base/rover separation;
  Atmospheric errors are reduced when base/rover are closely spaced.

The disadvantage of real-time single-difference data processing is that the results are only available after the correction data is received at the rover. Often the correction data is delayed by a few seconds to a few tens of seconds (in the case of satellite correction delivery). Hence single-difference delta phase processing is useful for applications that require accuracy without the need for near instantaneous results.

Mixed Delta-Phase: Receiver Clock Drift Considerations

When processing position differences using single-difference delta phase, the receiver clock drift parameter estimated is in fact the drift of the difference between rover and reference/correction clocks. In principle this does not imply any changes in the set-up of the computation of the position differences.

In practice, however, there is a trade-off between single-differenced and single-receiver delta phase. The reference/correction data might not have all satellites available that are tracked at the rover. Also, they might occasionally have cycle slips at satellites or signals where there are no cycle slips at the rover.

So, while in principle single-difference delta phase provides more accurate position difference estimates, there might be situations where the single-receiver delta-phase delivers better accuracy. To get the optimum performance, it is possible to use both single-differenced observables where they are available at rover and reference/correction data and single-receiver observables where they are only available at the rover.

One implication of this approach is that the estimation has now to account for two receiver clock drifts: the difference between rover and reference/correction data clock drifts for the single-difference observables and the single rover receiver clock drift for the not single-differenced observables.

One possible solution is to make sure that the reference/correction data clock drift is negligibly small compared to the rover clock drift. This could be implemented by using good atomic clocks with drift modeling at the reference/correction data collection. As this is normally not available in typical applications, the standard solution is to add a second clock-drift unknown (parameter) to the estimation process.

With equation (10) this would result in a linearized observation equation:

$$\begin{bmatrix} \delta\Delta\phi^1(k,l) - f^1[\tilde{x}(l), \tilde{y}(l), \tilde{z}(l), \delta\tilde{\tau}(k,l)] \\ \delta\Delta\phi^2(k,l) - f^2[\tilde{x}(l), \tilde{y}(l), \tilde{z}(l), \delta\tilde{\tau}(k,l)] \\ \ldots \\ \delta\phi^s(k,l) - f^s[\tilde{x}(l), \tilde{y}(l), \tilde{z}(l), \delta\tilde{\tau}(k,l)] \end{bmatrix}_{s\times 1} + \begin{bmatrix} v^1(k,l) \\ v^2(k,l) \\ \ldots \\ v^s(k,l) \end{bmatrix} = \qquad (15)$$

$$\begin{bmatrix} \partial f^1/\partial x(l) & \partial f^1/\partial y(l) & \partial f^1/\partial z(l) & 0 & 1 \\ \partial f^2/\partial x(l) & \partial f^2/\partial y(l) & \partial f^2/\partial z(l) & 0 & 1 \\ \ldots & \ldots & \ldots & \ldots & \ldots \\ \partial f^s/\partial x(l) & \partial f^s/\partial y(l) & \partial f^s/\partial z(l) & 1 & 0 \end{bmatrix} \begin{bmatrix} \Delta x(l) \\ \Delta y(l) \\ \Delta z(l) \\ \Delta\delta\tau(k,l) \\ \delta\Delta\delta\tau(k,l) \end{bmatrix}$$

Where $\Delta\delta\tau(k,l)$ is the single receiver clock drift and $\delta\Delta\delta\tau(k,l)$ is the difference between rover and reference/correction data clock drift, the first two observations relate to single-receiver differenced data and the last observation relates to single-differenced data.

As a consequence, one more satellite is needed to be able to estimate all unknowns—which are one more in this case. So while in the pure single-differenced and in the pure single-receiver case four satellites are required for a solution, the minimum required is five satellites in the mixed case. This also implies that for both flavors at least two satellites are required in order to contribute to position estimation.

Another consideration is using the proper weights for each observation type. For the single-receiver observation a different a priori error model has to be used including the unmodelled errors (e.g. satellite clock drift) than for the single-differenced observables.

The weight matrix modified from (11) is thus:

$$Q_{\Delta\delta\phi(k,l)} = \begin{bmatrix} \sigma^2_{\Delta\delta\phi^1(k,l)} & 0 & \ldots & 0 & 0 \\ 0 & \sigma^2_{\Delta\delta\phi^2(k,l)} & \ldots & 0 & 0 \\ \ldots & \ldots & \ldots & \ldots & \ldots \\ 0 & 0 & \ldots & \sigma^2_{\Delta\delta\phi^s(k,l)} & 0 \\ 0 & 0 & \ldots & 0 & \sigma^2_{\delta\phi^s(k,l)} \end{bmatrix} \qquad (16)$$

where $\sigma_{\delta\phi_U^s}^2$ is the proper variance for a single-receiver observation as for the first two observations and $\sigma_{\Delta\delta\phi_U^s}^2$ is the proper variance for a single-differenced observation as shown in (16).

Multi-Frequency Delta Phase Observations

The latest GPS satellites broadcast coherent carriers on L1, L2 and L5 frequency bands. GLONASS satellites broadcast on two bands near GPS L1 and L2. All planned GNSS signal structures include at least two bands per satellite. Multi-frequency carrier phase measurements are often combined into various linear combinations with particular properties. For example, the wide-lane GPS L1/L2 phase combination has an effective wavelength of 86 cm making it useful for ambiguity resolution purposes. The iono-free phase combination is particularly useful for (essentially) removing the effect of ionospheric bias.

The ionosphere presents a significant source of error in delta phase processing therefore the iono-free phase combination is particularly useful for delta phase positioning.

Practical Considerations for Low-Latency Positioning

For real-time kinematic applications, the position calculations are normally performed at the rover receiver. The rover data is available within a fraction of a second after being sampled by the receiver. On the other hand, the correction data must be sampled, formatted, transmitted, received and decoded before it can be used for processing at the rover. The latency of the correction data is typically 1-60 s, depending on the type of data link used. There are many high-precision applications where the location of the rover is required with very small latency. For example machine control where a cutting implement is driven to a design surface in real-time.

Combining Delta Positions and Synchronous Positions

Low latency RTK positioning can be achieved by combining single-receiver (rover) delta phase measurement processing with latent synchronous (base-rover) position solutions.

FIG. 8 presents a block diagram illustrating the various components of a GNSS data processing scheme. The rover GNSS data, 650, is prepared at 654. The GNSS correction data 652 is prepared at step 656. The prepared rover and correction data are time matched and used to form single-difference GNSS observations 664, using the Single Difference Builder 658. The prepared rover data (654) is applied to the single-receiver delta phase processor 660, to produce a time sequence of rover position differences 662. The single-difference GNSS data 664 is used by the synchronous processor 666 in an estimation scheme (e.g., least squares estimator or Kalman filter) to estimate the rover position as well as carrier phase ambiguity and other nuisance parameters. The output of the synchronous processor 666 is synchronous positions 668. The single-difference GNSS data 664, is also used in the single-difference delta phase processor 670, to produce a time sequence of rover receiver (single-difference) position differences (672). The rover position difference time sequence (662), synchronous positions (668) and single-difference rover position difference time sequence 672, are optionally combined in Blender 674 to produce the reported position 676.

Table 3 provides an illustration of the process used to construct reported position based on synchronous position and rover position difference estimates. In this example the correction data latency is 1 s and the data update rate is 5 Hz.

Note that the first delta phase epoch occurs at 1.2 s, when the two consecutive data epochs are available. Only rover position differences are available up until the first synchronized position fix is produced at epoch 2.0. Once synchronized position fixes are available, the reported position is constructed from the accumulation of rover position differences and the last synchronous fix. One Hz delta positions are used to propagate the synchronous positions across multiple seconds.

Note that every time a new synchronous position fix is available, it is used in the construction of the reported position. Hence any jump in the synchronous position fix will also be reflected in a jump in the reported position.

Note also that the synchronous position fix for epoch time 3.0 is missing, in practice this condition can occur if there is a temporary loss of a correction data packet in the datalink. In this case, the delta position propagation is simply extended from the last valid synchronous fix [U(2.0)].

TABLE 1

Example of low-latency solution generation using 5 Hz delta phase positions combined with 1 Hz synchronous positions.

| Epoch | Synchronous Position | Rover Position Difference (Time Sequence) | Reported Position |
|---|---|---|---|
| 1.0 | — | — | — |
| 1.2 | — | δU(1.0, 1.2) | — |
| 1.4 | — | δU(1.2, 1.4) | — |
| 1.6 | — | δU(1.4, 1.6) | — |
| 1.8 | — | δU(1.6, 1.8) | — |
| 2.0 | U(1.0) | δU(1.8, 2.0) | U(1.0) + δU(1.0, 2.0) |
| 2.2 | | δU(2.0, 2.2) | U(1.0) + δU(1.0, 2.0) + δU(2.0, 2.2) |
| 2.4 | | δU(2.2, 2.4) | U(1.0) + δU(1.0, 2.0) + δU(2.0, 2.2) + δU(2.2, 2.4) |
| 2.6 | | δU(2.4, 2.6) | U(1.0) + δU(1.0, 2.0) + δU(2.0, 2.2) + δU(2.2, 2.4) + δU(2.4, 2.6) |
| 2.8 | | δU(2.6, 2.8) | U(1.0) + δU(1.0, 2.0) + δU(2.0, 2.2) + δU(2.2, 2.4) + δU(2.4, 2.6) + δU(2.6, 2.8) |
| 3.0 | U(2.0) | δU(2.8, 3.0) | U(2.0) + δU(2.0, 3.0) |
| 3.2 | | δU(3.0, 3.2) | U(2.0) + δU(2.0, 3.0) + δU(3.0, 3.2) |
| 3.4 | | δU(3.2, 3.4) | U(2.0) + δU(2.0, 3.0) + δU(3.0, 3.2) + δU(3.2, 3.4) |
| 3.6 | | δU(3.2, 3.6) | U(2.0) + δU(2.0, 3.0) + δU(3.0, 3.2) + δU(3.2, 3.4) + δU(3.2, 3.6) |
| 3.8 | | δU(3.6, 3.8) | U(2.0) + δU(2.0, 3.0) + δU(3.0, 3.2) + δU(3.2, 3.4) + δU(3.2, 3.6) + δU(3.6, 3.8) |
| 4.0 | U(3.0) Missing | δU(3.8, 4.0) | U(2.0) + δU(2.0, 3.0) + δU(3.0, 4.0) |
| 4.2 | | δU(4.0, 4.2) | U(2.0) + δU(3.0, 4.0) + δU(4.0, 4.2) |
| 4.4 | | δU(4.2, 4.4) | U(2.0) + δU(2.0, 3.0) + δU(3.0, 4.0) + δU(4.0, 4.2) + δU(4.2, 4.4) |

In this example the synchronous positions have a latency of exactly 1 s.

Raw Data Vs Delta Position Buffering

Rather than buffering rover position difference estimates, an alternative approach would be to buffer carrier phase data at each epoch and then form delta phase measurements between the last synchronous epoch and the current time. The disadvantage of storing raw carrier phase observations is that significantly more data would need to be buffered compared with just rover position differences. Furthermore, if satellite tracking changes from one epoch to another epoch, it is possible that the number of common satellites between the first and last delta phase epochs may be less than 4, even though 4 or more satellites were tracked throughout.

Computing Formal Precision of Position Solution

The formal precision of the delta phase position solution can be derived directly from the least squares or Kalman filter process. The solution for the unknowns is given by:

$$\hat{x}(k,l) = (A(l)^T Q_{\delta\phi(k,l)}^{-1} A(l))^{-1} (A(l)^T Q_{\delta\phi(k,l)}^{-1} m(k,l)) \hat{x}(k,l) = G(k,l) \cdot m(k,l) \quad (17)$$

The formal precision of the unknowns is given by the inverse normal matrix:

$$Q_{\hat{x}(k,l)} = (A(l)^T Q_{\delta\phi(k,l)}^{-1} A(l))^{-1} \quad (18)$$

The a-priori measurement variances contained in $Q_{\delta\phi}^{-1}(k,l)$ must be reasonable in order for the output formal precisions of the unknowns to be correct. It is therefore important that the a-priori measurement variances consider all of the error sources affecting delta phase processing (see for single-receiver and single-difference error sources).

The formal precision of the delta position estimates provided in (17) are for one delta-phase epoch time span i.e. epoch k to epoch l. Considering all of the error sources affecting delta phase measurements, the following expression provides the delta phase measurement variance for the epoch span k to l, for a single satellite:

$$\sigma_{\delta\phi(k,l)}^2 = \sigma_{\phi(k)}^2 + \sigma_{\phi(l)}^2 + \sigma_{\delta T(k,l)}^2 + \sigma_{\delta P(k,l)}^2 + \sigma_{\delta\tau(k,l)}^2 + \sigma_{\delta\beta(k,l)}^2 + \sigma_{\delta I(k,l)}^2 + \sigma_{\delta\omega(k,l)}^2 \quad (19)$$

where:

$\sigma_{\phi(k)}^2$ uncorrelated phase measurement variance for epoch k;
$\sigma_{\phi(l)}^2$ uncorrelated phase measurement variance for epoch l;
$\sigma_{\delta T(k,l)}^2$ satellite clock variance for the epoch span k to l;
$\sigma_{\delta P(k,l)}^2$ satellite orbit variance for the epoch span k to l;
$\sigma_{\delta\tau(k,l)}^2$ variance of receiver clock drift for the epoch span k to l;
$\sigma_{\delta\beta(k,l)}^2$ variance of unmodelled tropospheric bias for the epoch span k to l;
$\sigma_{\delta I(k,l)}^2$ variance of unmodelled ionospheric bias for the epoch span k to l;
$\sigma_{\delta\omega(k,l)}^2$ variance of multipath bias for the epoch span k to l.

Note that in general the variance for each delta phase measurement will be different for each satellite tracked at the same epoch. Also the delta phase measurement variances will vary for each satellite over time. Satellites that are low on the local horizon tend to be more affected by atmospheric errors and multipath, therefore satellites low on the horizon are assigned larger tropospheric, ionospheric and multipath variances. Furthermore, the signal strength is worse near the horizon and therefore the uncorrelated measurement noise is worse.

Satellites with rigorous orbit and clock information can be processed with those satellites tracked at the same epoch that only have broadcast information. It is important to supply the appropriate a-priori measurement variances when mixing satellite observations derived from rigorous and broadcast sources.

The low-latency reported position is given as the sum of a number of delta position epochs, combined with the last synchronous position (see the example in Table 4, extracted from Table 3).

TABLE 4

Low-latency solution generation for epoch 4.0 s, based on synchronous solution at 2.0 s and delta positions.

| Epoch | Synchronous Position | Delta Phase | Reported Position |
| --- | --- | --- | --- |
| 4.0 | U(3.0) Missing | δU(3.8, 4.0) | U(2.0) + δU(2.0, 3.0) + δU(3.0, 4.0) |

The measurement variance for the delta phase epoch 2.0 to 4.0 is given by:

$$\sigma_{\delta\phi(2,4)}^2 = \sigma_{\phi(2)}^2 + \sigma_{\phi(4)}^2 + \sigma_{\delta T(2,4)}^2 + \sigma_{\delta\tau(2,4)}^2 + \sigma_{\delta\beta(2,4)}^2 + \sigma_{\delta I(2,4)}^2 + \sigma_{\delta\omega(2,4)}^2 \quad (20)$$

Simplistic Approach for Accumulating Delta Position Uncertainty

If the individual 1 Hz delta phase measurement variances for 2-4 s are accumulated, then there will be an over-estimation of the measurement variance, and an over-estimation of the derived rover position difference uncertainty:

$$\sigma_{\phi(2.0)}^2 + \sigma_{\phi(4.0)}^2 + \sigma_{\delta T(2.0,4.0)}^2 + \sigma_{\delta P(2.0,4.0)}^2 + \sigma_{\delta\tau(2.0,4.0)}^2 + \sigma_{\delta\beta(2.0,4.0)}^2 + \sigma_{\delta I(2.0,4.0)}^2 + \sigma_{\delta\omega(2.0,4.0)}^2 < \sigma_{\phi(2.0)}^2 + \sigma_{\phi(3.0)}^2 + \sigma_{\delta T(2.0,3.0)}^2 + \sigma_{\delta P(2.0,3.0)}^2 + \sigma_{\delta\tau(2.0,3.0)}^2 + \sigma_{\delta\beta(2.0,3.0)}^2 + \sigma_{\delta I(2.0,3.0)}^2 + \sigma_{\delta\omega(2.0,3.0)}^2 + \sigma_{\phi(3.0)}^2 + \sigma_{\phi(4.0)}^2 + \sigma_{\delta T(3.0,4.0)}^2 + \sigma_{\delta P(3.0,4.0)}^2 + \sigma_{\delta\tau(3.0,4.0)}^2 + \sigma_{\delta\beta(3.0,4.0)}^2 + \sigma_{\delta I(3.0,4.0)}^2 + \sigma_{\delta\omega(3.0,4.0)}^2 \quad (21)$$

The over-estimation of the measurement variance in (21) is due to the inclusion of the uncorrelated noise term $\sigma_{\phi(3.0)}^2$ twice on the right-hand side (RHS) of Equation (21). The uncorrelated noise terms are generally small compared with multipath errors and therefore one approach is to ignore the over-estimation problem and allow the reported position variances to be too pessimistic (too conservative).

Time-Wise Separated Approach for Accumulating Delta Position Uncertainty

In a new and more rigorous approach the measurement variance components are first divided as follows:

$$\sigma_{\delta\phi(k,l)}^2 = \sigma_{\phi(k)}^2 + \sigma_{\phi(l)}^2 + \sigma_{\delta\Sigma(k,l)}^2 \quad (22)$$

where:

$\sigma_{\delta\Sigma(k,l)}^2$ sum of time-wise variances for the epoch span k to l, where:

$$\sigma_{\delta\Sigma(k,l)}^2 = \sigma_{\delta T(k,l)}^2 + \sigma_{\delta P(k,l)}^2 + \sigma_{\delta\tau(k,l)}^2 + \sigma_{\delta\beta(k,l)}^2 + \sigma_{\delta I(k,l)}^2 + \sigma_{\delta\omega(k,l)}^2 \quad (23)$$

At each delta phase measurement epoch, the following two position uncertainties are computed:

$$Q_{\hat{x}(k,l)} = (A(l)^T Q_{\delta\phi(k,l)}^{-1} A(l))^{-1} \quad (18)$$

$$Q_{\hat{x}\Sigma(k,l)} = (A(l)_T Q_{\delta\Sigma(k,l)}^{-1} A(l))^{-1} \quad (24)$$

Equation (18) is the standard formula for computing the delta phase position uncertainty. Whereas, just the time-wise errors are considered in the delta position uncertainty calculation in (24). Both $Q_{\hat{x}(k,l)}$ and $Q_{\hat{x}\Sigma(k,l)}$ are computed and stored for each delta phase time span.

The delta position uncertainty accumulation process is best explained by way of an example. Considering the delta position computations in Table 4:

$$U(2.0) + \delta U(2.0, 3.0) + \delta U(3.0, 4.0)$$

the uncertainty in the reported position is given by the sum of:

synchronous position uncertainty, plus
all time-wise delta position uncertainties, except the last epoch span, plus the uncorrelated measure noise and time-wise errors for the last epoch span.

In matrix form:

$$Q_{\tilde{x}(2,0)} \quad \text{synchronous position} \quad (25)$$
$$+ Q_{\tilde{x}\Sigma(2,0,3,0)} \quad \text{time-wise}$$
$$+ Q_{\tilde{x}(3,0,4,0)} \quad \text{time-wise + uncorrelated}$$

The approach for accumulating the formal precision of report positions assumes that the time-wise errors are linear over time. Experience has shown that this assumption holds so long as the accumulation time is relatively short (i.e. less than 5 minutes—see Traugott, J, et. al. 2008, *A Time-Relative Approach for Precise Positioning with a Miniaturized L1 GPS Logger*, ION-GNSS 2008, 21$^{st}$ International Technical Meeting of the US Institute of Navigation, Satellite Division, 16-19 Sep., Savannah, Ga., pp 1883-1894).

Delta Phase Positioning Using Rigorous Orbit and Clock Information

Instabilities in the GNSS satellite clocks directly impact on the error growth of single-receiver delta phase based positioning. The satellite clock drift error amounts to around 3-6 mm/s for single-receiver position difference estimates (see Table 6). The satellite clock error therefore inhibits the length of time that delta positions can be propagated forward while maintaining cm-level accuracy. For example, a 20 s propagation time would lead to say a 6-12 cm error in the single-receiver position estimates.

Similarly inaccuracy in the broadcast GPS/GLONASS satellite ephemerides leads to roughly a linear growth of several mm/s in the single-receiver delta position estimates. The broadcast GPS orbit and clock information is updated every hour. Short-term (1-100 s) satellite clock effects are therefore not represented in the broadcast GPS Navigation Messages.

The error growth of single-receiver delta phase positioning can be bounded with the aid of rigorous satellite orbit and clock information. MEO satellite trajectories are generally smooth, however fluctuations in solar radiation pressure and eclipsing events can cause fluctuations in the satellite orbit with respect to the broadcast antenna location. Satellite clock information needs to be updated every few seconds to ensure that error growth in single-receiver delta position do not exceed a few millimeters.

Rigorous Network Predicted Orbits

The International GNSS Service (IGS) generates rigorous network predicted orbits based on GNSS data from globally distributed tracking stations. The IGS refers to their rigorous-network predicted orbits as Predicted Precise Orbits. Their Predicted Precise Orbits are made available for download via the Internet (see Kouba, *A Guide to Using International GPS Service (IGS) Products*. Geodetic Survey Division, Natural Resources Canada, February 2003, http://igscb.jpl.nasa.gov/components/prods.html).

The IGS Predicted Precise orbits are updated 4 times per day and have a quoted accuracy of 5 cm. Independent testing has shown that occasionally several meters of error may occur in the IGS orbit products.

Rigorous Network Predicted Orbits and Clocks Based on a Global Network and Regional Augmentation U.S. Provisional Application for Patent No. 61/277,184 filed 19 Sep. 2009 (TNL A-2585P) and International Patent Application No. PCT/US2010/002564 filed 19 Sep. 2010, International Publication Number WO 2011/034616 A2 dated 24 Mar. 2011 (TNL A-2585PCT) include a detailed explanation of an apparatus/method for estimating rigorous orbits and clocks based on a Global satellite tracking network. Parts 8 and 9 thereof document the estimation of rigorous orbits and clocks respectively.

International Patent Application PCT/US2011/24733 filed 14 Feb. 2011, WO 2011/126605 A2 dated 13 Oct. 2011 (TNL A-2633PCT) describes how global and regional GNSS tracking stations are used together with network processing software for estimating rigorous orbit and clock corrections. The system delivers GNSS satellite orbits with a precision of around 5 cm, and an update rate of 10 s. Rigorous clock information is generated and is provided to rover receivers at a rate of 2 s. The combination of rigorous orbit and clock information means that the error growth for single-receiver delta phase positioning is bounded.

Mixing Clock Data of Varying Quality

Most GNSS satellite clocks have very stable behavior, however certain events have been observed on several GPS satellites between 2009-2010. Those events show a satellite clock noise which is about one magnitude larger than usual. To avoid using clock predictions during such an event, clock predictability numbers are computed and sent to the rover.

A two-state filter can be used to model the satellite clock behavior, where the state time update model is defined by:

$$\begin{bmatrix} T^s(k) \\ \dot{T}^s(k) \end{bmatrix} = \begin{bmatrix} 0 & \Delta t \\ 0 & 1 \end{bmatrix} \begin{bmatrix} T^s(k-1) \\ \dot{T}^s(k-1) \end{bmatrix} + \begin{bmatrix} 0 \\ w \end{bmatrix} \quad (26)$$

where:
$T^s(k)$ satellite clock error at epoch k for satellite s;
$\dot{T}^s(k)$ satellite clock drift at epoch k for satellite s;
$\Delta t$ time difference between epoch k and epoch k−1;
ww system noise for the satellite clock rate, assumed a random walk process with a noise input of say $10^{-12}$ m$^2$/s.

The observation model is given by:

$$y^s(k) = [1 \ 0] \begin{bmatrix} T^s(k-1) \\ \dot{T}^s(k-1) \end{bmatrix} + v^s(k) \quad (27)$$

where:
y$^s$(k) input rigorous clock error computed by the network and supplied to the rover for satellite s at epoch k,
v$^s$(k) residual for the precise clock error, and where the expected value of the residual product is given by:

$$E[v^s(k)v^s(k)^T] = R(k) \quad (28)$$

where
R(k) variance of the residuals.

A Kalman filtering scheme can be applied to the models defined by Equations (26), (27) and (28), with one filter per satellite.

A prediction of the satellite clock error is made based on the filtered satellite clock error and satellite clock drift according to:

$$\begin{bmatrix} \tilde{T}^s(k+1) \\ \tilde{\dot{T}}^s(k+1) \end{bmatrix} = \begin{bmatrix} 1 & \Delta t \\ 0 & 1 \end{bmatrix} \begin{bmatrix} \hat{T}^s(k) \\ \hat{\dot{T}}^s(k) \end{bmatrix} \quad (29)$$

where the accent ~ indicates a predicted quantity, and accent ^ represents a filtered quantity. When processing single-receiver delta phase, the predicted clock error $\tilde{T}^s(k)$ for each satellite is used in the right-hand side (RHS) of (4) to correct the delta phase measurements.

A clock predictability number can be generated for each satellite by studying the magnitude of prediction errors due to various prediction lengths up to a predefined interval of say two minutes. The largest difference between the predicted clock correction and estimated one provides the predictability number:

$$p_n^s(k) = \max\{|T^s(k) - [T^s(k-j) + j\tilde{\dot{T}}^s(k-j)]| : j \in \{1, \ldots, n\}\} \quad (30)$$

where:
- j epoch (time) difference with respect to the epoch k;
- n maximum epoch (time) difference to consider in the predictability number estimate (interval size);
- $p_n^s(k)$ predictability number at epoch k (seconds) for satellite s, with an interval size of n seconds.

The predictability numbers $p^s_{120}(k)$ for good satellites are typically below 0.25 m, for a regular satellite it is between 0.25 m and 0.5 m, for a bad satellite it's between 0.5 m and 0.75 m. If the number is above 0.75 m the satellite should not be used for predictions. Most of the GPS and nearly all GLONASS satellites have numbers below 0.25 m.

Satellite clock quality indicators can be produced either by the network software or by the rover(s). The clock quality indicators are used in the apriori noise model of the rover receiver delta phase processor. Satellites with highly predictable clocks are therefore given more weight (smaller variance $\sigma_{\delta T(k,l)}^2$) than satellites with poor predictability. Furthermore, satellites that have only orbit/clock correction parameters from the broadcast navigation data are given less weight (larger variance) than those satellites with rigorous orbit/clock corrections.

Characterization of Errors Affecting Delta Phase Observations

Apart from the small random measurement errors, there are a number of systematic errors that affect delta phase observations. Table 5 provides a summary of the systematic errors affecting delta phase observations.

TABLE 5

Characterization of errors affecting delta phase observations.

| Parameter | Description | Characteristic of error |
|---|---|---|
| $\delta T(k, l)$ | Satellite clock drift | Dependent on the stability of the satellite clock. Satellite atomic frequency standards have long term stabilities of $\sim 10^{-12}$. The satellite clock drift rate must be scaled by the speed of light to determine the impact on the delta phase measurements. The unmodelled satellite clock drift rate causes several millimeters/second error in delta phase positioning. |
| $\delta P(k, l)$ | Satellite orbit error | Broadcast GPS orbits have a precision of 1-5 m; while GLONASS satellites are slightly worse. Rigorous orbits are good to around 2-5 cm. Satellite orbit errors cause a drift in the delta phase position estimates which is dependent on the magnitude of the satellite position error. |
| $\delta\beta(k, l)$ | Tropospheric bias | The tropospheric bias term refers to the unmodelled part of the tropospheric error rate. Generally the tropospheric bias changes slowly (over tens of minutes), however passing weather fronts cause a faster rate of change of say 10-50 mm/minute. |

TABLE 5-continued

Characterization of errors affecting delta phase observations.

| Parameter | Description | Characteristic of error |
|---|---|---|
| $\frac{\delta I(k, l)}{f^2}$ | Ionospheric bias | The rate of change of the unmodelled ionospheric bias is on the order of say 5-20 mm/s for low elevation satellites and less for high-elevation satellites (under stable ionospheric conditions). The iono bias is a significant error source for delta phase processing. When dual-(or triple-) frequency data is available, the ionospheric bias can be obviated using iono-free delta phase processing. |
| $\delta\omega(k, l)$ | Multipath bias | The rate of change of the carrier phase multi-path is typically 5-20 mm/minute for low-elevation satellites and much less for high elevation satellites (which are generally less affected by signal reflections). Multipath bias is cyclic in nature and is generally <5 cm in magnitude. |

Quantification of Errors Affecting Delta Phase Observations

Table 6 provides a summary of the magnitude of errors affecting single-receiver and single-difference delta phase observations. In the case of single-receiver delta phase positioning, all satellite and atmospheric errors directly impact on rover position difference estimates. With single-difference delta phase processing the closer the separation of base and rover the less the impact of orbit and atmospheric errors on the estimated rover position difference.

TABLE 6

Quantification of errors affecting single-receiver and single-difference delta phase observations, (baseline factor B = base-rover-separation/satellite-altitude).

| | Typical Error Magnitude for Delta Phase Measurements for a Single Satellite | |
|---|---|---|
| Error Source | Single-Receiver | Single-Difference |
| Satellite clock drift | 1.0e−3 to 6.0e−3 m/s | Nil |
| Satellite orbit error | broadcast orbit: 1.0e−3 to 3.0e−3 m/s rigorous network predicted orbit: 3.0e−3 to 5.0e−4 m/s rigorous orbit: 5.0e−5 to 7.5e−5 m/s | broadcast orbit: B*1.0e−3 to B*3.0e−3 m/s rigorous network predicted orbit: B*3.0e−3 to B*5.0e−4 m/s rigorous orbit: B*5.0e−5 to B*7.5e−5 m/s |
| Tropospheric bias | 5.0e−6 to 1.0e−3 m/s | B*5.0e−6 to B*1.0e−3 m/s |
| Ionospheric bias | 1.0e−3 to 0.02 m/s Nil when using iono-free phase | B*0.001 to B*0.02 m/s Nil when using iono-free phase |
| Multipath bias | Up to 0.0005 m/s | Up to 0.0005 * sqrt(2) m/s |

Rigorous Orbit/Clock Errors

Table 7 summarizes the errors affecting single-receiver delta phase processing based on rigorous orbit/clock correction data. Note that the satellite clock drift and orbit errors only accumulate until the next satellite clock/orbit correction message is received. Also note that the ionospheric bias is normally zero since iono-free delta phase processing is used. The remaining errors are due to unmodelled tropospheric bias and carrier phase multipath, both of which change relatively slowly over time.

TABLE 7

Magnitude of typical errors affecting delta phase measurements for a single satellite/receiver aided with rigorous satellite orbit and clock information.

| Error Source | Magnitude of Error Source |
| --- | --- |
| Satellite clock drift | ~1.0e−4 m/s |
| Satellite orbit error | ~5.0e−5 m/s |
| Tropospheric bias | 5.0e−6 to 1.0e−3 m/s |
| Ionospheric bias | Nil for iono-free phase |
| Multipath bias | Up to 0.0005 m/s |

Correcting Delta-Phase for Incorrect Starting Position

Background

The computation of rover position difference from delta phase measurements involves the use of approximate rover coordinates at the first and current epochs as described above in steps 1-7 of Rover Position Difference Processing Steps. The smaller (larger) the error in the approximate rover coordinates, the smaller (larger) the error in the computed position deltas.

In FIG. 9, the true rover positions at the first and second epoch are 710 and 715, denoted U(1) and U(2) respectively. The corresponding true ranges for the first and second epoch are R(1) and R(2) respectively. In practice the true user position is not known, but rather approximate user positions are obtained from, e.g., autonomous or differential GNSS solutions. The approximate user positions at the first and second epoch are 720 and 725, denoted: U'(1) [x'(1), y'(1), z'(1)] and U'(2) [x'(2), y'(2), z'(2)] respectively. The ranges computed from the biased user positions are denoted R'(1) and R'(2) respectively. Errors in the computed ranges lead to errors in the rover position difference estimates. In effect a strain is produced in the computed range, which tends to increase over time as satellites move.

A test has shown that 100 m of error in the initial position can produce a height variation of +/−20 cm over a 5 s delta phase propagation time. It is important to be able to minimize the impact of errors in the approximate user position used in delta phase processing.

Adjustment for Initial Position Errors

A simple solution would be to re-compute the rover position differences as soon as the precise RTK-based initial position solution is available. This however implies that all the rover data has to be stored in the receiver and that at the time when the RTK-based initial position becomes available, multiple rover epochs have to be processed, introducing a momentary increase in CPU load.

The proposed method involves computing the rover position differences as soon as the rover data becomes available. The derived rover position differences are subsequently corrected for a change in the initial position as soon as a precise anchor position is made available.

Let U'(k) be the assumed user position at the first epoch k, with the true user position at epoch k, U(k). Let the error in the user position at epoch k, be given by:

$$\epsilon(k)=U'(k)-U(k) \quad (31)$$

The error in delta position caused by the error in the user location at epoch k is given by:

$$\gamma(k,l)=[A(l)^T Q_{\delta\phi(k,l)}^{-1} A(l)]^{-1} [A(l)^T Q_{\delta\phi(k,l)}^{-1}][A(k)-A(l)]\epsilon(k) \quad (32)$$

where:

A(k) measurement partials at epoch k;
A(l) measurement partials at epoch l;
$Q_{\delta\phi(k,l)}^{-1}$ weight matrix for the delta phase measurements for epoch span k to l;
$\epsilon(k)$ error in the user position at epoch k;
$\gamma(k,l)$ error in the delta position over epoch k to l.

Recall that $[A(l)^T Q_{\delta\phi(k,l)}^{-1} A(l)]^{-1} [A(l)^T Q_{\delta\phi(k,l)}^{-1}]$ in (32) is called the measurement gain matrix [G(k,l)] and is available in the original estimation process [see (12)]. The second term [A(k)−A(l)] reflects the geometry change between both epochs mainly caused by motion of the satellites and has to be computed in parallel to the initial delta-position estimation using the approximate initial position. For each delta-position estimate, the approximate previous epoch position U'(k) and the 3×3 matrix $\gamma(k,l)=[A(l)^T Q_{\delta\phi(k,l)}^{-1} A(l)]^{-1} [A(l)^T Q_{\delta\phi(k,l)}^{-1}][A(k)-A(l)]$ are kept for later correction when a better estimate for U(k) becomes available.

FIG. 10 contains a flowchart which summarizes the procedure used to adjust delta position estimates for errors in initial coordinates. The following example illustrates the position adjustment process:

At 800, a synchronous position becomes available for epoch 1.0 s (i.e. we have Ŭ(1.0)). The synchronous (anchor) position is known to be accurate to say a few centimeters in a global sense.

The time sequence (rover delta position difference) buffer is scanned in steps 805 and 810 until a matching interval is found with starting time 1.0 s and end time 2.0 s.

The approximate (initial) position used in the rover position difference calculation is U'(1.0), computed in step 815, hence the error in the approximate position is therefore:

$$\epsilon(1.0)=\breve{U}(1.0)-U'(1.0)$$

which is computed at 820.

By making use of (29), the adjustment to the rover position difference for epoch 1.0–2.0 is given by:

$$\gamma(1.0,2.0)=G(1.0,2.0)(A(1.0)-A(2.0))\epsilon(2.0)$$

The adjusted rover position difference for epoch 2.0 is then computed at 825 and is given by the saved (and slightly biased) rover position difference, plus the correction for initial position error:

$$\delta\breve{U}(1.0,2.0)=\delta\breve{U}(1.0,2.0)+\gamma(1.0,2.0)$$

The adjusted position for epoch 2.0 is produced at 830 based on:

$$\breve{U}(2.0)=\breve{U}(1.0)+\delta\breve{U}(1.0,2.0)$$

A test is made at step 835 to see if the adjustment process is complete for all epochs. The current time is 3.0 s, hence steps 3-6 must be repeated for the time interval 2.0-3.0 s.

Initial position error at epoch 2.0 s (step 820):

$$\epsilon(2.0)=\breve{U}(2.0)-U'(2.0)$$

Rover position difference adjustment for epoch 2.0-3.0 s:

$$\gamma(2.0,3.0)=G(2.0,3.0)(A(2.0)-A(1.0))\epsilon(3.0)$$

Adjust rover position difference for epoch 3.0 s (step 825):

$$\delta\breve{U}(2.0,3.0)=\delta\hat{U}(2.0,3.0)+\gamma(2.0,3.0)$$

The adjusted position for epoch 3.0 s (step 830):

$$\breve{U}(3.0)=\breve{U}(2.0)+\delta\breve{U}(2.0,3.0)$$

Once the adjustment process is complete, the final updated position Ŭ(3.0) is reported at step 840.

FIG. 11 depicts the adjustment for initial position errors. In the example, just the height component of a stationary rover is considered. In the top sub-graph 900, hollow circles correspond to autonomous height estimates at each measurement epoch (920). Grey lines indicate rover position difference height estimates. Note that the further the initial height is away from the correct height, the larger the error in the rover position difference height estimate. Also note that the rover position difference height estimates are affected in this example by both the systematic effect of initial height error, plus the random delta phase measurement errors.

The trace in sub-graph 905, is obtained by first shifting the rover position difference height estimate for t(1.0,1.1) to join with the synchronous position height at t(1.0). Next the rover position difference height estimate t(1.1-1.2) is linked to the previous position at t(1.1), and so on until the next synchronous position height is available, in this case at t(2.0). The synchronous position height estimates contain small errors and therefore discontinuities exist when linking delta positions with synchronous positions.

In sub-plot 910, rover position difference heights are linked to the synchronous position estimates and adjusted for errors in the initial position estimates.

Applicability of Adjustment Process

The rover position difference adjustment process outlined above was presented based on a low-latency, single-receiver delta phase-based positioning example. It should be stressed that the adjustment process is valid for all types of single-receiver and single-difference delta phase positioning.

Reduction of Position Jumps in Low-Latency Solutions

BACKGROUND

Single-receiver rover position difference estimates are normally generated at say 5, 10 or 20 Hz. Typically the rover position difference estimates form a smooth trajectory Small jumps sometimes occur with changes in satellites geometry, i.e. new satellites entering the solution, or satellites being lost. As implied by the name, rover position difference estimates only provide relative changes in user location over time. The absolute position of the user is required at an epoch to be able to anchor the rover position differences. Synchronous position estimates derived from a position+ambiguity processor are normally used in conjunction with delta phase processing to produce low-latency position estimates.

Measurement errors lead to variations in the synchronous position estimates, which in turn leads to discontinuities in the reported position trajectory.

FIG. 12 illustrates a 10 Hz rover position difference trajectory 1005, from time 1.0 to 4.0 s. Just the height component is shown. Synchronous position solutions are generated at 1 Hz and are illustrated as solid black circles 1010, 1020, 1030 & 1040. The rover position difference trajectory 1005 is first adjusted to the synchronous position 1010, at 1.0 s. When the next synchronous position is available for 2.0 s, 1020, the rover position difference trajectory is shifted by 1045, to 1060. Trajectory 1060 is again shifted based on the synchronous position 1030, at 3.0 s, to form 1070. This adjustment process is repeated at 4.0 s, and so on.

A step in the rover position difference trajectory occurs for each synchronous position adjustment. Note that the magnitude of the stepping effect has been exaggerated for the purposes of this example.

FIG. 13 illustrates a 4 s rover position difference trajectory (1105). Synchronous positions are obtained at times 1,2,3 & 4 s, denoted 1110, 1120, 1130 & 1140 respectively. Comparisons can be made between the rover position difference estimates at 1 Hz epochs (1115, 1125 & 1135) with the corresponding synchronous position estimates (1120, 1130 & 1140), thus leading to the differences 1145, 1150 and 1155, respectively. Rather than introducing abrupt steps in the reported position trajectory, it is possible to blend the rover position difference trajectory with the synchronous positions.

The blending process involves the following steps:
1. Obtain a synchronous position for a given anchor epoch (time),
2. Obtain an older synchronous position and propagate it using rover position difference(s) to the anchor epoch—thus producing a propagated position for the anchor epoch,
3. A weighting factor is generated for the anchor epoch synchronous position and a weighting factor is generated for the older synchronous position, propagated to the anchor epoch.
4. A blended anchor position is generated from the anchor epoch synchronous position and the older synchronous position propagated to the anchor epoch.
5. Optionally, multiple synchronous positions, propagated to the anchor epoch can be used in the blending process. The number of synchronous positions considered in the blending process is a design parameter.

Blending Factor Adjustment

A buffer of the last n synchronous position fixes is maintained, as well as a buffer of the last n corresponding rover position difference estimates. Table 8 provides an example of the position buffering and blending process for the example given in FIG. 13. The synchronous positions are shown in column 2 as: U(1.0), U(2.0), U(3.0) & U(4.0). Delta phase processing yields rover position differences: U(1.0,2.0), U(2.0,3.0), U(3.0,4.0) as shown in column 3 Multiple estimates of the position at the anchor epochs can be obtained using the previous synchronous solutions and the buffered delta positions as shown in column 4. Blending factors η(a,b) are used to weight the synchronous solution and propagated synchronous positions at the anchor epoch.

The selection of the weighting factors [η(a,b)] determines the characteristics of the blended solution. Normally the most recent synchronous position is given the most weight, while the oldest position the least weight. A linear, exponential or other suitable, weighting scheme can be used.

The example in Table 8 shows that the last 4 seconds of propagated synchronous solutions are used in the blended anchor position. The number of solutions considered in the blending process is limited in order to minimize the computation load and buffer storage requirements. Furthermore, in practice, only 2-10 s are needed to effectively blend the solutions.

Linear Blending

The following formula can be used to compute linear blending factors:

$$n_{linear}(a, b) = \begin{cases} \dfrac{\chi - [b - a]}{\chi} & \text{for } [b - a] \leq \chi \\ 0 & \text{else} \end{cases} \quad (33)$$

where:
a time of first synchronous epoch considered in blending;
b time of latest synchronous epoch considered in blending;
$\chi$ maximum time span to consider in blending;
$\eta_{linear}(a,b)$) Linear blending factor for time span a to b.

Table 9 presents an example of linear blending factors where the maximum blending time-span $\chi$=4 seconds.

TABLE 8

Blending factor adjustment for Low-latency solution generation for epoch 3.0 s, based on synchronous solution at 2.0 s and 5 Hz rover position differences.

| Synchronous Epoch | Synchronous Position | Rover Position Difference | Propagated Synchronous Positions | Blended Anchor Position |
|---|---|---|---|---|
| 1.0 | U(1.0) | — | U(1.0) | U(1.0) *η(1, 1) |
| 2.0 | U(2.0) | δU(1.0, 2.0) | U(1.0) + δU(1.0, 2.0) | [U(1.0) + δU(1.0, 2.0)] *η(1, 2) + U(2.0) *η(2, 2) |
| 3.0 | U(3.0) | δU(2.0, 3.0) | U(1.0) + δU(1.0, 2.0) + δU(2.0, 3.0); | [U(1.0) + δU(1.0, 2.0) + δU(2.0, 3.0)] * η(1, 3) + |
|  |  |  | U(2.0) + δU(2.0, 3.0) | [U(2.0) + δU(2.0, 3.0)] * η(2, 3) + U(3.0) *η(3, 3) |
| 4.0 | U(4.0) | δU(3.0, 4.0) | U(1.0) + δU(1.0, 2.0) + δU(2.0, 3.0) + δU(3.0, 4.0); | [U(1.0) + δU(1.0, 2.0) + δU(2.0, 3.0) + δU(3.0, 4.0)] * η(1, 4) + |
|  |  |  | U(2.0) + δU(2.0, 3.0) + δU(3.0, 4.0); | [U(2.0) + δU(2.0, 3.0) + δU(3.0, 4.0)] * η(2, 4) + |
|  |  |  | U(3.0) + δU(3.0, 4.0); | [U(3.0) + δU(3.0, 4.0)] * η(3, 4) + U(4.0) *η(4, 4) |
| 5.0 | U(5.0) | δU(4.0, 5.0) | U(1.0) + δU(1.0, 2.0) + δU(2.0, 3.0) + δU(3.0, 4.0) + δU(4.0, 5.0); | [U(1.0) + δU(1.0, 2.0) + δU(2.0, 3.0) + δU(3.0, 4.0) + δU(4.0, 5.0)] * η(1, 5) + |
|  |  |  | U(2.0) + δU(2.0, 3.0) + δU(3.0, 4.0) + δU(4.0, 5.0); | [U(2.0) + δU(2.0, 3.0) + δU(3.0, 4.0) + δU(4.0, 5.0)] * η(2, 5) + |
|  |  |  | U(3.0) + δU(3.0, 4.0) + δU(4.0, 5.0); | [U(3.0) + δU(3.0, 4.0) + δU(4.0, 5.0)] * η(3, 5) + |
|  |  |  | U(4.0) + δU(4.0, 5.0); | [U(4.0) + δU(4.0, 5.0)] * η(4, 5) + U(5.0) *η(5, 5) |

TABLE 9

Linear blending factors for example in Table 6, based on a maximum blending time-span $\chi = 4$ s.

| Epoch | Factor Indices (a, b) | Raw Blending Factors η(a, b) | Normalized Blending Factors $\frac{\eta(a, b)}{\sum_a \eta(a, b)}$ |
|---|---|---|---|
| 1.0 | 1, 1 | 1.0 | 1.0 |
| 2.0 | 1, 2 | 0.75 | 0.4286 |
|  | 2, 2 | 1.0 | 0.5714 |
| 3.0 | 1, 3 | 0.5 | 0.2222 |
|  | 2, 3 | 0.75 | 0.3333 |
|  | 3, 3 | 1.0 | 0.4444 |
| 4.0 | 1, 4 | 0.25 | 0.1000 |
|  | 2, 4 | 0.5 | 0.2000 |
|  | 3, 4 | 0.75 | 0.3000 |
|  | 4, 4 | 1.0 | 0.4000 |
| 5.0 | 1, 5 | 0.0 | 0.0 |
|  | 2, 5 | 0.25 | 0.1000 |
|  | 3, 5 | 0.5 | 0.2000 |
|  | 4, 5 | 0.75 | 0.3000 |
|  | 5, 5 | 1.0 | 0.4000 |

Precision-Based Blending

Changes in satellite geometry result in changes to the synchronous position fix quality. Hence, the precision of each synchronous position fix will generally be different. Furthermore, the longer a synchronous position is propagated with rover position differences, the greater the uncertainty in the resultant solution. The relative precisions of each propagated position fix can be used to compute the blending factors. A precision-based blending scheme endeavors to account for the relative differences in precisions of the rover position difference propagated and synchronous solutions.

The raw precision-based blending factors are given by:

$$\eta_{prec}(a,b)_x = 1/\sigma^2(a,b)_x$$

$$\eta_{prec}(a,b)_y = 1/\sigma^2(a,b)_y$$

$$\eta_{prec}(a,b)z = 1/\sigma^2(a,b)_z \quad (34)$$

where:
- $\sigma^2(a,b)_x$ Variance of the x-coordinate for the position fix spanning time a to b.
  - For example if a=b, then this is the variance of the synchronous fix. When a<b, the variance corresponds to synchronous fix at time a, that has been propagated using rover position differences, to time b.
- $\sigma^2(a,b)_y$ Variance of the y-coordinate for the position fix spanning time a to b;
- $\sigma^2(a,b)_z$ Variance of the z-coordinate for the position fix spanning time a to b.
- $\eta_{prec}(a,b)_x$ Precision-based blending factor for the x-coordinate, for the position fix spanning time a to b. With analogous definitions for the y and z coordinates.

Note that the raw blending factors need to be normalized (so that they sum to 1.0).

An illustration of the precision-based blending scheme is presented in Table 10. Just the x-coordinate is included in the example. However the approach used for the y- and z-coordinate is analogous to that used for the x-coordinate.

TABLE 10

Precision-based blending factors for example in Table 6. The x-coordinate blending factors are computed based on the precisions of the x-coordinate shown in column 3.

| Epoch | Factor Indices a, b | Precision of Solution (x-coordinate) $\sigma^2(a, b)_x$ | Raw Blending Factors $\eta_{prec}(a, b)_x$ | Normalized Blending Factors $\dfrac{\eta_{prec}(a, b)_x}{\sum_a \eta_{prec}(a, b)_x}$ |
|---|---|---|---|---|
| 1.0 | 1, 1 | 0.025 | 40.00 | 1.0 |
| 2.0 | 1, 2 | 0.031 | 32.26 | 0.4363 |
|     | 2, 2 | 0.024 | 41.67 | 0.5636 |
| 3.0 | 1, 3 | 0.037 | 27.03 | 0.2735 |
|     | 2, 3 | 0.030 | 33.33 | 0.3373 |
|     | 3, 3 | 0.026 | 38.46 | 0.3892 |
| 4.0 | 1, 4 | 0.043 | 23.26 | 0.1876 |
|     | 2, 4 | 0.036 | 27.78 | 0.2241 |
|     | 3, 4 | 0.032 | 31.25 | 0.2521 |
|     | 4, 4 | 0.024 | 41.67 | 0.3361 |
| 5.0 | 1, 5 | 0.049 | 20.41 | 0.1367 |
|     | 2, 5 | 0.042 | 23.81 | 0.1595 |
|     | 3, 5 | 0.038 | 26.31 | 0.1762 |
|     | 4, 5 | 0.030 | 33.33 | 0.2232 |
|     | 5, 5 | 0.022 | 45.45 | 0.3044 |
| 6.0 | 1, 6 | 0.055 | 18.18 | 0.1016 |
|     | 2, 6 | 0.048 | 20.83 | 0.1164 |
|     | 3, 6 | 0.042 | 23.81 | 0.1331 |
|     | 4, 6 | 0.036 | 27.78 | 0.1552 |
|     | 5, 6 | 0.028 | 35.71 | 0.1996 |
|     | 6, 6 | 0.019 | 52.63 | 0.2941 |

Bridging Reference Station Changes

Background

In a prior invention described in GNSS Position Coasting, US Patent Publication 2010/0214162 A1 {A2555}, single-difference delta phase processing is used to propagate fixed quality synchronous position results forward in time in order to bridge segments of float quality synchronous position results. The GNSS Position Coasting scheme helps to extend the amount of time that fixed quality solutions are available for high precision operation.

The use of rigorous satellite clock and orbit information for improved delta positioning is described in Vollath, Position Determination with reference data outage, U.S. Pat. No. 7,576,690. The satellite clock and orbit errors are significant component of the single-reference delta phase measurements. Once satellite clock/orbit errors are removed, the precision of the single-receiver rover position difference estimates are greatly improved.

Single-receiver delta phase processing with rigorous satellite and clock information, is termed here Precise (single-receiver) Delta Phase. When the rigorous satellite clock information is predicted in time, this is termed Predicted Precise Delta Phase.

The following events can cause interruptions to high-precision position results at the rover:
1. Switch from fixed quality to float quality synchronous position results;
2. Cycle slips occur on reference station satellite data which results in insufficient single-difference satellite tracking to perform a synchronous solution;
3. The physical reference station changes in a network data stream, which normally causes a reset in the synchronous position processor and an interruption to the position report, followed by a period of float-quality positioning.

New Approach

A new unified approach has been developed which addresses specifically issue 3 above, as well as more generally handing degraded positioning caused by issues 1, 2 & 3. In the new approach, the following methods of solution propagation are used to produce the best position result (where the best result is deemed as the one with the highest precision (smallest uncertainty)):
1. Single-difference delta phase (which yields single-difference rover position difference);
2. Precise (single-receiver) delta phase (which yields precise rover position difference);
3. Predicted precise (single-receiver) delta phase (which yields predicted-precise rover position difference);
4. Single-receiver delta phase (which yields rover position difference (broadcast orbits and clocks).

FIG. 14 provides an illustration of the relative uncertainties of various solutions types over time assuming all solution types use the same satellite geometry. The axis 1205 corresponds to fixed-quality synchronous solutions, with each position 1230, identified with solid black dots. The uncertainty of the positions is represented by error bars 1235.

The float-quality synchronous positions on axis 1210, have larger uncertainty than the fixed-quality synchronous solutions, as evidenced by the longer error bars 1245. Each float-quality synchronous position, 1240, shows larger variations about the zero axis, 1210.

The error growth of single-difference rover position differences is represented by the region between the dashed lines (1255) on axis 1215. Each single-difference rover position estimate 1250, is shown by a grey circle surrounded by a black ring.

The precise single-receiver rover position difference positions are presented on axis 1220. Each position fix is marked by a black ring (1260). The error growth of the precise rover position difference estimates is shown as the region 1265, assuming that the propagation time starts at first epoch and accumulates thereafter.

The predicted-precise single-receiver rover position differences are presented on axis 1222. Each position fix is marked by a dark grey circle surrounded by a black ring (1262). The error growth of the predicted-precise rover position difference estimates is shown as the region 1267.

The single-receiver rover position differences (broadcast orbits and clocks) is shown on axis 1225, with each position fix marked by a grey ring. The error growth of the single-receiver rover position differences is defined by the region 1275.

Assuming a common satellite geometry, the time-wise error growth of single-difference rover position difference is lower than that of the precise (single-receiver) rover position difference; which is lower than the predicted-precise rover position difference; which is lower than the single-receiver rover position difference (broadcast orbits and clocks). Single-difference processing requires reference and rover receivers to be tracking common satellites. In many circumstances, the number of single-difference satellites may be less than the number of rover (single-) receiver satellites. In which case, the single-difference rover position difference error growth may be worse than that of single-receiver rover position differences.

FIG. 15 presents timeline views of positions (height component only) derived from prior art and new techniques. The upper axis 1305, refers to prior-art positioning methods, while the lower axis, 1310, to new techniques. The position trace for axis 1305 is denoted 1315; for axis 1310, the position trace is denoted 1320.

Considering the prior-art method (axis 1305), during times 1-2, the solution has fixed quality. Between epochs 2 & 3, there is a switch in the physical reference station (or loss of satellite tracking at the reference), this event, denoted 1325, causes the synchronous processor to reset. This results in a period of float quality synchronous positioning up until epoch 6. During the float period, the accuracy of the reported position is only decimeter-level. At epoch 6, the synchronous fixed quality is reestablished (segment 1350) and retained until reference station corrections are lost just after epoch 7. The float quality solutions are propagated using single-receiver delta positions through segment 1355.

In the new approach, precise single-receiver rover position difference processing is used at epoch 3 (denoted 1370) to propagate the fixed quality synchronous solution from epoch 2 to epoch 3. Single-difference rover position difference processing is then used at epochs 4-6, to produce high-quality position estimates until regular synchronous fixed quality solutions are regained at epoch 6. Precise single-receiver rover position difference processing is again used between epochs 7-9, while the reference receiver data is unavailable. Note that the use of precise-single receiver rover position difference processing and single-difference rover position differences enables fixed quality solutions to be provided (segment 1360). The rigorous clock/orbit corrections are lost at event 1335, around epoch 9, after which only single-receiver (broadcast orbits and clocks) rover position difference processing is used to deliver solutions with float quality (segment 1365).

The combination of precise single-receiver rover position difference and single-difference rover position difference processing gives the new method a clear advantage in delivering fixed quality positions, versus prior art techniques.

FIG. 16 presents a flowchart that explains the handling of data at the rover. When new data arrives at 1505, it is tested at 1510 to see if it is rover data. If so, rover data handling occurs at 1525. Predicted Precise orbit and clock information when available (see test 1512) is handled at 1527. Test 1515 checks for the presence of Precise Orbit and Clock information. When present, the Precise Orbits and Clocks are handled at 1530. The input data is tested at 1520 to see if it is from the reference and can be single-differenced. If so, the single-difference data is handled at 1535.

FIG. 17 shows an expanded view of flowchart 1500. When rover data is received, it is used to form a rover position difference solution between the current and previous epoch (1605). The rover position difference estimate is then buffered at step 1610, and optionally used to generate a low-latency position estimate at 1612.

When available, the rigorous predicted satellite clock/orbit models are updated at 1613. The rigorous predicted clock/orbit information is optionally used at 1614 to update the rover position difference for the current data epoch. At 1615, the rigorous predicted orbit information is used to update the time sequence of rover position difference estimates. The best rover position difference time sequence is generated at 1616 based on the predicted precise rover position difference time sequence and existing broadcast rover position difference time sequence. The best rover position difference from 1616 is used to replace the predicted rover position difference time sequence at 1617.

The rigorous satellite clock/orbit models are updated at 1620, as soon as rigorous orbit and clock information is received for one or more satellites. The rigorous clock models enable the rover position difference time sequence derived from broadcast clocks to be optionally refined (1625) and stored. The rigorous orbit and clock information is used to form a precise rover position difference estimate for the current and previous epochs at 1630. At step 1635, the best rover position difference time sequence is produced based on the existing precise position sequence Finally at 1640, the predicted rover position difference time sequence is replaced by the rover position difference time sequence with the smallest error.

When synchronous reference data are received, they are used to compute single-difference delta phase measurements and rover position difference estimates at 1645. The rover position difference time sequence with the smallest uncertainty is generated at step 1650, and used to replace the existing rover position difference time sequence at 1655. A synchronous position result is produced at 1660, using the latest single-difference GNSS measurements. The best (smallest uncertainty) synchronous position solution is derived from the latest synchronous position result, and the single-difference rover position difference time sequence in step 1665. If for example the synchronous position result is float quality, then often the single-difference rover position difference time sequence that was propagated from the last fixed quality solution will be the best (smallest uncertainty). At 1670, all of the single-difference rover position differences up to the reference data time tag are replaced with the new synchronous position solution Finally at step 1675, an optional report of the synchronous position is provided which will be latent with respect to the current time.

Following is a summary of some of the inventive concepts described herein:

[Part A: Predicted Precise] [TNL A-2796]
1. A positioning method, comprising:
   a. obtaining GNSS data derived from signals received at a rover antenna,
   b. obtaining at least one of correction data and rigorous satellite data, c. maintaining a time sequence of at least one rover position and at least one rover position difference with associated time tags,
d. using the time sequence to determine at least one derived rover position,
e. reporting the derived rover position, and
f. maintaining a set of GNSS satellite clock error models, comprising
   i. upon arrival of rover data associated with a new time tag, extending the time sequence, and
   ii. upon arrival of rigorous satellite data, updating at least one clock error model.
2. The method of 1, wherein maintaining a set of GNSS satellite clock error models further comprises, upon arrival of rigorous satellite orbit and clock data, updating the time sequence.
3. The method of 1 or 2, further comprising using the updated at least one clock error model to update at least one rover position of the time sequence.
4. The method of one of 1-3, wherein the set of satellite clock error models comprises up to one clock error model per satellite.
5. The method of one of 1-4, wherein the correction data comprises at least one of: single-base-station observations [RTK], virtual reference station observations derived from reference stations of a regional network [VRS], synthetic base station observations derived from reference stations of a global network [SBS], synthetic reference station observations derived from reference stations of a global network with regional augmentation [SRS], and state space representations [RTCM SSR].
6. The method of one of 1-5, wherein rigorous satellite data comprises precise orbit and precise clock data per satellite.
7. Apparatus for performing a method according to one of 1-6.
8. A computer program comprising instructions for causing an apparatus to perform a method according to one of 1-6.
9. A computer program product comprising a tangible computer-readable medium embodying instructions for causing an apparatus to perform a method according to one of 1-6.

[Part B: Mixed Delta—Mixing Quality in One Epoch] [TNL A-2798]
1. A positioning method, comprising
   a. obtaining GNSS data derived from signals received at a rover antenna,
   b. obtaining at least one of correction data and rigorous satellite data,
   c. maintaining a time sequence of at least one rover position and at least one rover position difference with associated time tags, by estimating at least one position difference using rigorous satellite data from multiple satellites using at least two selected combinations of
      i. for at least one satellite, no correction data and broadcast satellite data,
      ii. for at least one satellite, no correction data and rigorous predicted satellite data,
      iii. for at least one satellite, no correction data rigorous satellite data for said at least one satellite,
      iv. for at least one satellite, correction data and broadcast satellite data,
      v. for at least one satellite, rigorous predicted satellite data and correction data,
      vi. for at least one satellite, rigorous satellite data and correction data,
   d. using the time sequence to determine at least one derived rover position, and
   e. reporting the derived rover position.
2. The method of 1, wherein estimating at least one position difference using rigorous satellite data from multiple satellites using at least two selected combinations comprises applying a filter having two clock states per satellite.
3. The method of one of 1-2, wherein the correction data comprises at least one of: single-base-station observations [RTK], virtual reference station observations derived from reference stations of a regional network [VRS], synthetic base station observations derived from reference stations of a global network [SBS], synthetic reference station observations derived from reference stations of a global network with regional augmentation [SRS], and state space representations [RTCM SSR].
4. The method of one of 1-3, wherein rigorous satellite data comprises rigorous orbit data per satellite and rigorous clock data per satellite.
5. Apparatus for performing a method according to one of 1-4.
6. A computer program comprising instructions for causing an apparatus to perform a method according to one of 1-4.
7. A computer program product comprising a tangible computer-readable medium embodying instructions for causing an apparatus to perform a method according to one of 1-4.

[Part C: Improve/Cleanup the Buffer] [TNL A-3126]
1. A positioning method, comprising
   a. obtaining GNSS data derived from signals received at a rover antenna,
   b. obtaining at least one of correction data and rigorous satellite data,
   c. maintaining a time sequence of at least one rover position and at least one rover position difference with associated time tags by,
      i. upon arrival of correction data, extending the time sequence with a computed synchronized position, and
      ii. upon arrival of one of correction data and rigorous satellite data, modifying at least a portion of the time sequence,
   d. using the time sequence to determine at least one derived rover position, and
   e. reporting the derived rover position.
2. The method of 1, wherein the computed synchronized position comprises one of: a real-time kinematic [RTK] position, a position determined using a weighted average of integer ambiguity candidates, a position determined using a differential positioning technique [DGPS], a position determined with the aid of an inertial navigation system, and a technique using GNSS data to determine an absolute position.
3. [Mixing and Replacing] The method of one of 1-2, wherein modifying at least a portion of the time sequence comprises replacing at least one position difference by at least one improved position difference [lower variance].
4. The method of 3, wherein replacing at least one position difference by at least one improved position difference comprises replacing at least one position difference determined using broadcast satellite data with at least one position difference determined using rigorous predicted satellite data.
5. The method of one of 3-4, wherein replacing at least one position difference by at least one improved position difference comprises blending at least one position difference determined using broadcast satellite data with at least one position difference determined using rigorous predicted satellite data.
6. The method of one of 3-5, wherein replacing at least one position difference by at least one improved position difference comprises replacing at least one position difference determined using rigorous predicted satellite data with at least one position difference determined using rigorous satellite data.
7. The method of one of 3-6, wherein replacing at least one position difference by at least one improved position difference comprises blending at least one position difference determined using rigorous predicted satellite data with at least one position difference determined using rigorous satellite data.
8. The method of one of 3-7, wherein replacing at least one position difference by at least one improved position difference comprises replacing at least one position difference determined using rigorous satellite data with at least one position difference determined using corrected single-differenced data.
9. The method of one of 3-8, wherein replacing at least one position difference by at least one improved position difference comprises blending at least one position difference determined using rigorous satellite data with at least one position difference determined using corrected single-differenced data.
10. The method of one of 3-9, wherein replacing at least one position difference by at least one improved position difference comprises replacing at least one position difference determined using corrected single-differenced data with at least one position difference determined using corrections synchronous with rover data.
11. The method of one of 3-10, wherein replacing at least one position difference by at least one improved position difference comprises blending at least one position difference determined using corrected single-differenced data with at least one position difference determined using corrections synchronous with rover data.
12. The method of one of 1-11, wherein maintaining a time sequence further comprises, upon arrival of rigorous satellite data, replacing at least one position difference by at least one improved position difference.
13. [Replacing] The method of one of 1-12, wherein modifying at least a portion of the time sequence comprises replacing a portion of the time sequence with an improved portion of the time sequence.
14. The method of 13, wherein the improved portion of the time sequence has an estimated precision which is better than an estimated precision of a portion of the time sequence which it replaces.
15. The method of one of 13-14, wherein the improved portion of the time sequence has a number of entries which is fewer than a number of entries of a portion of the time sequence which it replaces.
16. The method of one of 13-15, wherein the improved portion of the time sequence is determined by, starting from a position determined using corrections synchronous with rover data as an anchor position at a time tag, deriving a new anchor position for the time tag from the anchor position and at least one other previously estimated position at the time tag.
17. [selecting] The method of 16, wherein deriving a new anchor position for the time tag comprises selecting between the anchor position and the at least one other previously estimated position at the time tag based on comparison of an estimated precision of the anchor position with an estimated precision of the at least one other previously estimated position at the time tag.
18. The method of 17, wherein at least one estimated precision is determined from a covariance matrix.
19. The method of one of 17-18, wherein the new anchor position for the time tag is selected based on smallest estimated three-dimensional precision.
20. The method of one of 17-18, wherein the new anchor position for the time tag is selected based on smallest estimated horizontal precision.
21. The method of one of 17-18, wherein the new anchor position for the time tag is selected based on smallest vertical precision.
22. [blending] The method of 16, wherein deriving a new anchor position for the time tag comprises blending the anchor position with the at least one other previously estimated position at the time tag.
23. The method of 22, wherein blending comprises forming a weighted mean of the anchor position and at least one other previously estimated position at the time tag.
24. Apparatus for performing a method according to one of 1-23.
25. A computer program comprising instructions for causing an apparatus to perform a method according to one of 1-23.
26. A computer program product comprising a tangible computer-readable medium embodying instructions for causing an apparatus to perform a method according to one of 1-23.

[Part D: Jump Reduction] [TNL A-2638]
1. A positioning method, comprising
  a. obtaining for each epoch of a set of at least one epoch a respective synchronous position to be propagated to an anchor epoch,
  b. for each epoch of the set, combining the respective synchronous position with at least one rover position difference defining a change of rover position from the epoch of the respective synchronous position to the anchor epoch, to obtain a respective propagated position for the anchor epoch,
  c. obtaining a synchronous position for the anchor epoch,
  d. blending at least one propagated position for the anchor epoch with the synchronous position for the anchor epoch to obtain a blended anchor position for the anchor epoch,
  e. determining a propagated rover position for a current epoch by combining the blended anchor position with at least one rover position difference defining a change of rover position from the anchor epoch to the current epoch.
2. The method of 1, wherein the blending comprises blending a selected number of propagated positions for the anchor epoch with the synchronous position for the anchor epoch.
3. The method of one of 1-2, wherein the blending is based on at least one weighting factor.
4. The method of one of 1-3, wherein at least one weighting factor is based on age of a synchronous position used to obtain a propagated position which is blended to obtain the blended anchor position for the anchor epoch.

5. The method of 4, wherein at least one weighting factor declines linearly with age of a synchronous position used to obtain a propagated position which is blended to obtain the blended anchor position for the anchor epoch.

6. The method of 4, wherein at least one weighting factor declines exponentially with age of a synchronous position used to obtain a propagated position which is blended to obtain the blended anchor position for the anchor epoch.

7. The method of one of 1-3, wherein at least one weighting factor is based on an estimated precision of a propagated position which is blended to obtain the blended anchor position for the anchor epoch.

8. The method of 8, wherein at least one weighting factor is based on an estimated precision of the synchronous position for the anchor epoch.

9. The method of one of 1-3, wherein the blending is proportional to respective estimated precisions of the at least one propagated position for the anchor epoch and of the synchronous position for the anchor epoch.

10. Apparatus for performing a method according to one of 1-9.

11. A computer program comprising instructions for causing an apparatus to perform a method according to one of 1-9.

12. A computer program product comprising a tangible computer-readable medium embodying instructions for causing an apparatus to perform a method according to one of 1-9.

[Part E: Selecting/Blending] [TNL A-2797]

1. A positioning method, comprising
   a. obtaining GNSS data derived from signals received at a rover antenna,
   b. obtaining correction data,
   c. maintaining a time sequence of at least one rover position and at least one rover position difference with associated time tags,
   d. using the time sequence to determine at least one derived rover position by, starting from a position determined using corrections synchronous with rover data as an anchor position at a time tag, deriving a new anchor position for the time tag of the anchor position and at least one other estimated rover position at the time tag of the anchor position, and
   e. at least one of
      i. reporting the new anchor position at the time tag as the rover position at a time associated with the time tag of the anchor position, and
      ii. combining the new anchor position at the time tag of the anchor position with at least one rover position difference to determine a new derived rover position for a subsequent time tag, and reporting the new derived rover position as the rover position at a time associated with the subsequent time tag.

2. [selecting] The method of 1, wherein deriving a new anchor position for the time tag comprises selecting between the anchor position and the at least one other previously estimated position at the time tag based on comparison of an estimated precision of the anchor position with an estimated precision of the at least one other previously estimated position at the time tag.

3. The method of 2, wherein at least one estimated precision is determined from a covariance matrix.

4. The method of one of 1-3, wherein the new anchor position for the time tag is selected based on smallest estimated three-dimensional precision.

5. The method of one of 1-3, wherein the new anchor position for the time tag is selected based on smallest estimated horizontal precision.

6. The method of one of 1-3, wherein the new anchor position for the time tag is selected based on smallest vertical precision.

7. [blending] The method of 1, wherein deriving a new anchor position for the time tag comprises blending the anchor position with the at least one other previously estimated position at the time tag.

8. The method of 7, wherein blending comprises forming a weighted mean of the anchor position and at least one other previously estimated position at the time tag.

9. Apparatus for performing a method according to one of 1-8.

10. A computer program comprising instructions for causing an apparatus to perform a method according to one of 1-8.

11. A computer program product comprising a tangible computer-readable medium embodying instructions for causing an apparatus to perform a method according to one of 1-8.

[Part F: Correcting Delta-Phase for Incorrect Starting Position] [TNL A-2705]

1. A positioning method, comprising
   a. obtaining an approximate rover anchor position for a first epoch,
   b. using the approximate rover anchor position to determine a rover position difference for at least one succeeding epoch,
   c. obtaining an improved rover anchor position for the first epoch,
   d. deriving an adjusted rover position difference for each said succeeding epoch, and
   e. deriving a rover position for a current epoch from the improved rover anchor position for the first epoch and at least one adjusted rover position difference.

2. The method of 1, wherein the approximate rover anchor position contains an initial error, wherein the rover position difference for each said succeeding epoch contains a respective partial error based on the initial error, and wherein deriving an adjusted rover position difference for each said succeeding epoch comprises correcting each rover position difference for the respective partial error.

3. Apparatus for performing a method according to one of 1-2.

4. A computer program comprising instructions for causing an apparatus to perform a method according to one of 1-2.

5. A computer program product comprising a tangible computer-readable medium embodying instructions for causing an apparatus to perform a method according to one of 1-2.

The foregoing description of embodiments is not intended as limiting the scope of but rather to provide examples of the invention as defined by the claims. Those of ordinary skill in the art will realize that the detailed description of embodiments of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. Portions of the methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLD5), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented in part on a data processing computer such as a personal computer, workstation computer, mainframe computer, or high-performance server running an operating system such as a version of Microsoft Windows, or various versons of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented in part by means of a computer program. The computer program may be loaded on an apparatus as described above. Therefore, the invention also relates to a computer program, which, when carried out on an apparatus performs portions of any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on apparatus already in the field, i.e. a computer program which is delivered to the field as a computer program product. This applies to each of the above-described methods and apparatuses.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of deriving a position of a rover using a receiver system, the method comprising:
   a. obtaining an approximate anchor position for a first epoch, the approximate anchor position comprising at least one of an autonomous position determined by the rover or a differential position determined by the rover, the approximate anchor position determined without correction data for the first epoch from one or more reference stations,
   b. using the approximate anchor position to determine a rover position difference for at least one succeeding epoch, the approximate anchor position being determined by the receiver system, thereafter
   c. obtaining an improved anchor position for the first epoch, the improved anchor position comprising a synchronous position determined by the rover using correction data for the first epoch from one or more reference stations,
   d. deriving an adjusted rover position difference for each said succeeding epoch, the adjusted rover position difference being determined by the receiver system, and
   e. deriving the position of the rover for a current epoch from the improved anchor position for the first epoch and the adjusted rover position difference for the current epoch, the rover position being determined by the receiver system.

2. The method of claim 1,
   wherein the approximate anchor position contains an initial error,
   wherein the rover position difference for each said succeeding epoch contains a respective partial error based on the initial error, and
   wherein operating the processor to derive an adjusted rover position difference for each said succeeding epoch comprises correcting each rover position difference for the respective partial error.

3. A tangible non-transitory computer-readable medium embodying instructions for enabling an apparatus to perform the method of claim 1.

4. A non-transitory computer readable medium encoded with a computer program that includes instructions to cause a processor to derive a position of a rover, comprising:
   a. obtaining an approximate anchor position for a first epoch, the approximate anchor position comprising at least one of an autonomous position determined by the rover or a differential position determined by the rover, the approximate anchor position determined without correction data for the first epoch from one or more reference stations,
   b. using the approximate anchor position to determine a rover position difference for at least one succeeding epoch, c. obtaining an improved Fever anchor position for the first epoch, the improved anchor position comprising a synchronous position determined by the rover using correction data for the first epoch from one or more reference stations,
d. deriving an adjusted rover position difference for each said succeeding epoch, and
e. deriving the position of the rover for a current epoch from the improved anchor position for the first epoch and the adjusted rover position difference for the current epoch.

5. The apparatus of claim 4,
wherein the approximate anchor position contains an initial error,
wherein the rover position difference for each said succeeding epoch contains a respective partial error based on the initial error, and
wherein to derive an adjusted rover position difference for each said succeeding epoch comprises correcting each rover position difference for the respective partial error.

\* \* \* \* \*